(12) United States Patent
Zhang et al.

(10) Patent No.: US 9,820,094 B2
(45) Date of Patent: *Nov. 14, 2017

(54) TRAVEL RECOMMENDATIONS ON ONLINE SOCIAL NETWORKS

(71) Applicant: Facebook, Inc., Menlo Park, CA (US)

(72) Inventors: Ying Zhang, Palo Alto, CA (US); Wei Zhang, Fremont, CA (US); Nicolas Scheffer, San Francisco, CA (US); Richard Calvi, San Jose, CA (US); Xiaohua Yan, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 1 day.

This patent is subject to a terminal disclaimer.

(21) Appl. No.: 14/822,710

(22) Filed: Aug. 10, 2015

(65) Prior Publication Data

US 2017/0048664 A1    Feb. 16, 2017

(51) Int. Cl.
| | |
|---|---|
| *H04M 3/42* | (2006.01) |
| *H04W 24/00* | (2009.01) |
| *G06Q 30/00* | (2012.01) |
| *H04W 4/02* | (2009.01) |
| *H04L 29/08* | (2006.01) |
| *G06F 17/30* | (2006.01) |
| *G06Q 30/02* | (2012.01) |
| *G06Q 50/00* | (2012.01) |

(52) U.S. Cl.
CPC ........ *H04W 4/021* (2013.01); *G06F 17/3097* (2013.01); *G06F 17/30867* (2013.01); *H04L 67/22* (2013.01); *H04L 67/306* (2013.01); *G06Q 30/0267* (2013.01); *G06Q 50/01* (2013.01)

(58) Field of Classification Search
CPC ..... G06Q 30/00; G06F 7/06; G06F 17/30867; G06F 17/3097; G06F 17/30; G06F 50/14; G06F 10/02; G06F 50/01; G06F 30/02; G06F 30/0267; H04L 67/22; H04L 67/306; H04W 4/021; H04W 4/02
See application file for complete search history.

(56) References Cited

U.S. PATENT DOCUMENTS

| | | | | |
|---|---|---|---|---|
| 2009/0157613 | A1* | 6/2009 | Strohmenger | G06Q 10/10 |
| 2009/0281875 | A1* | 11/2009 | Tarka | G06Q 10/02 |
| | | | | 705/5 |

(Continued)

*Primary Examiner* — Olumide T Ajibade Akonai
(74) *Attorney, Agent, or Firm* — Baker Botts L.L.P.

(57) ABSTRACT

In one embodiment, a social-networking system may receive, from a client system of a first user of an online social network, an indication that the first user is traveling to a first geographic location, and identify one or more second geographic locations within a threshold distance from the first geographic location. The second geographic locations may be determined based on a travel-recommendation model. The travel-recommendation model may include aggregated user information from the online social network associated with the first user and aggregated travel information from the online social network associated with one or more second users of the online social network who have traveled to the first geographic location. The social-networking system may generate travel recommendations based on the identified second geographic locations, and then send, to the client system of the first user, one or more of the travel recommendations for display to the first user.

21 Claims, 14 Drawing Sheets

(56) References Cited

U.S. PATENT DOCUMENTS

| | | | |
|---|---|---|---|
| 2013/0024391 A1* | 1/2013 | Vakil | G06Q 30/0282 705/319 |
| 2014/0025490 A1* | 1/2014 | Shekar | G06Q 30/0255 705/14.53 |
| 2014/0222570 A1* | 8/2014 | Devolites | G06Q 30/0261 705/14.58 |

* cited by examiner

TRAVEL RECOMMENDATIONS ON ONLINE SOCIAL NETWORKS

TECHNICAL FIELD

This disclosure generally relates to social graphs and providing recommendations for places.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, the social-networking system may generate travel recommendations for a user that the social-networking system has determined is or will be traveling to a particular geographic location. Generally, the social-networking system may gather and analyze location data and social-graph data for users of the social network in order to provide "travel agent" and "travel log"-like functionalities. As an example and not by way of limitation, when users of the social-networking system go traveling, they frequently post and upload information relating to their travels, including information on points of interest they visited and recommendations and reviews of these points of interest, restaurant recommendations, and general travel tips and recommendations. As another example and not by way of limitation, the social-networking system may have access to information relating to each of these users, including, for example, personal information (e.g., personal preferences/interests such as particular interests in outdoors activities, certain historical periods, etc.; family information such as size of family, number of children, etc.; and historical information such as previous vacations and places/tourist attractions visited); social network information (e.g., any and all information relating to other users that are part of the user's social network, in addition to information relating to users of the social-networking system at large); and location information (e.g., including GPS information of where the user is or has been, and information on what route these users took for a trip to obtain information on optimal route determination/selection). In particular embodiments, the social-networking system 160 aggregate data from all of these sources of information in order to leverage the data to generate travel recommendations. In particular embodiments, the social-networking system may generate optimized travel itineraries for a user that the social-networking system has determined is or will be traveling to a particular location. As discussed above, when users of the social-networking system go traveling, they frequently post and upload information relating to their travels. As an example and not by way of limitation, as discussed above, the social-networking system itself may have access to a plethora of information relating to each of these users. The social-networking system can aggregate data from all of these sources of information in order to leverage the data to generate optimized travel itineraries for a particular location. In addition, the social-networking system can extract travel information from a user's uploads and/or posts based on classifying the data obtain from these sources of information as relating to sightseeing and traveling, as discussed below. Based on the information collected from the users, the social-networking system can convert this unstructured information regarding travel information associated with a plurality of users into a structured database of route information for specific locations and/or points of interest in a particular area (e.g., a tourist area such as Paris, France). The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
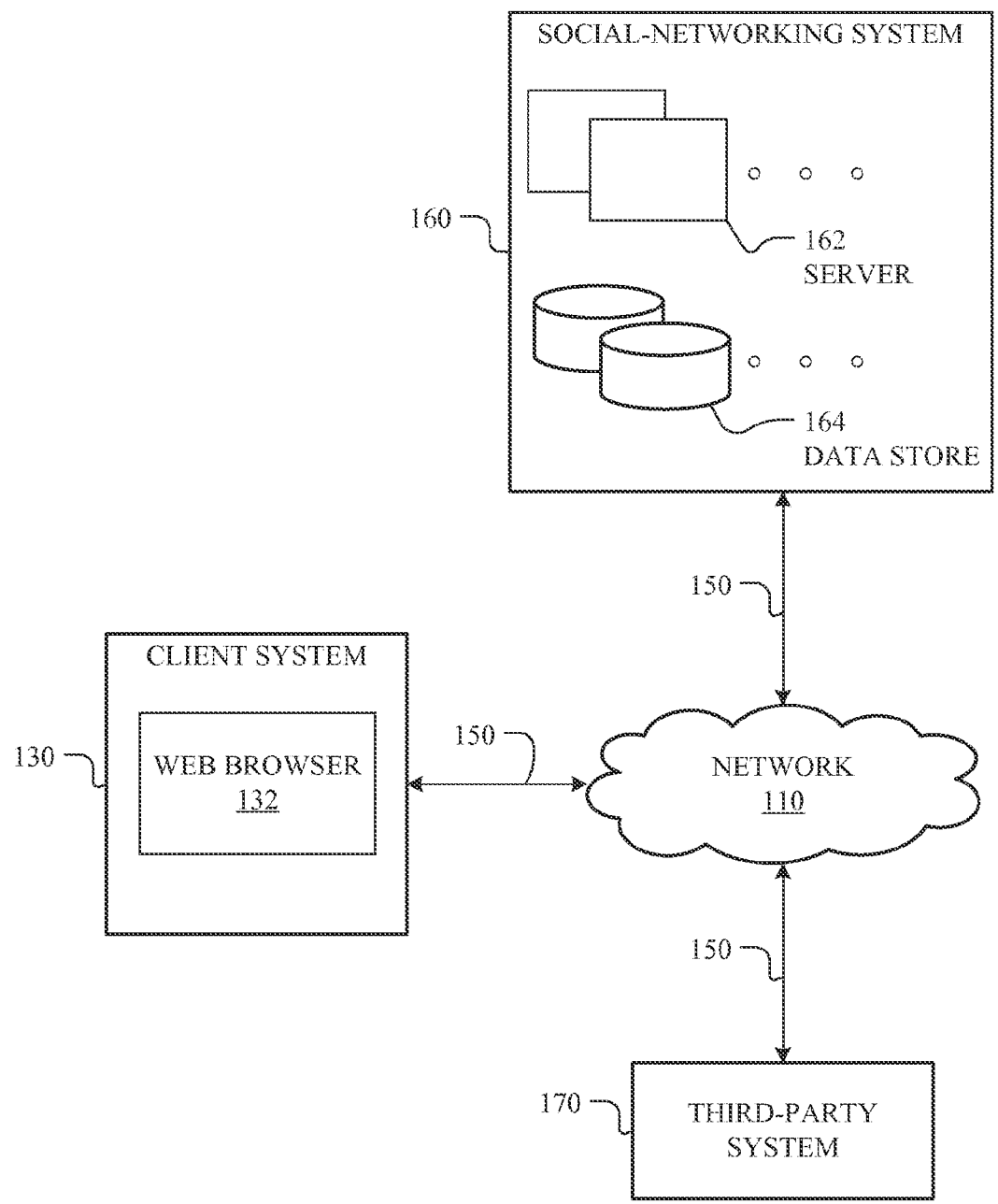
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of a client system 130, a social-networking system 160, a third-party system 170, and a network 110, this disclosure contemplates any suitable arrangement of a client system 130, a social-networking system 160, a third-party system 170, and a network 110. As an example and not by way of limitation, two or more of a client system 130, a social-networking system 160, and a third-party system 170 may be connected to each other directly, bypassing a network 110. As another example, two or more of a client system 130, a social-networking system 160, and a third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client systems 130, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-andnetwork-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
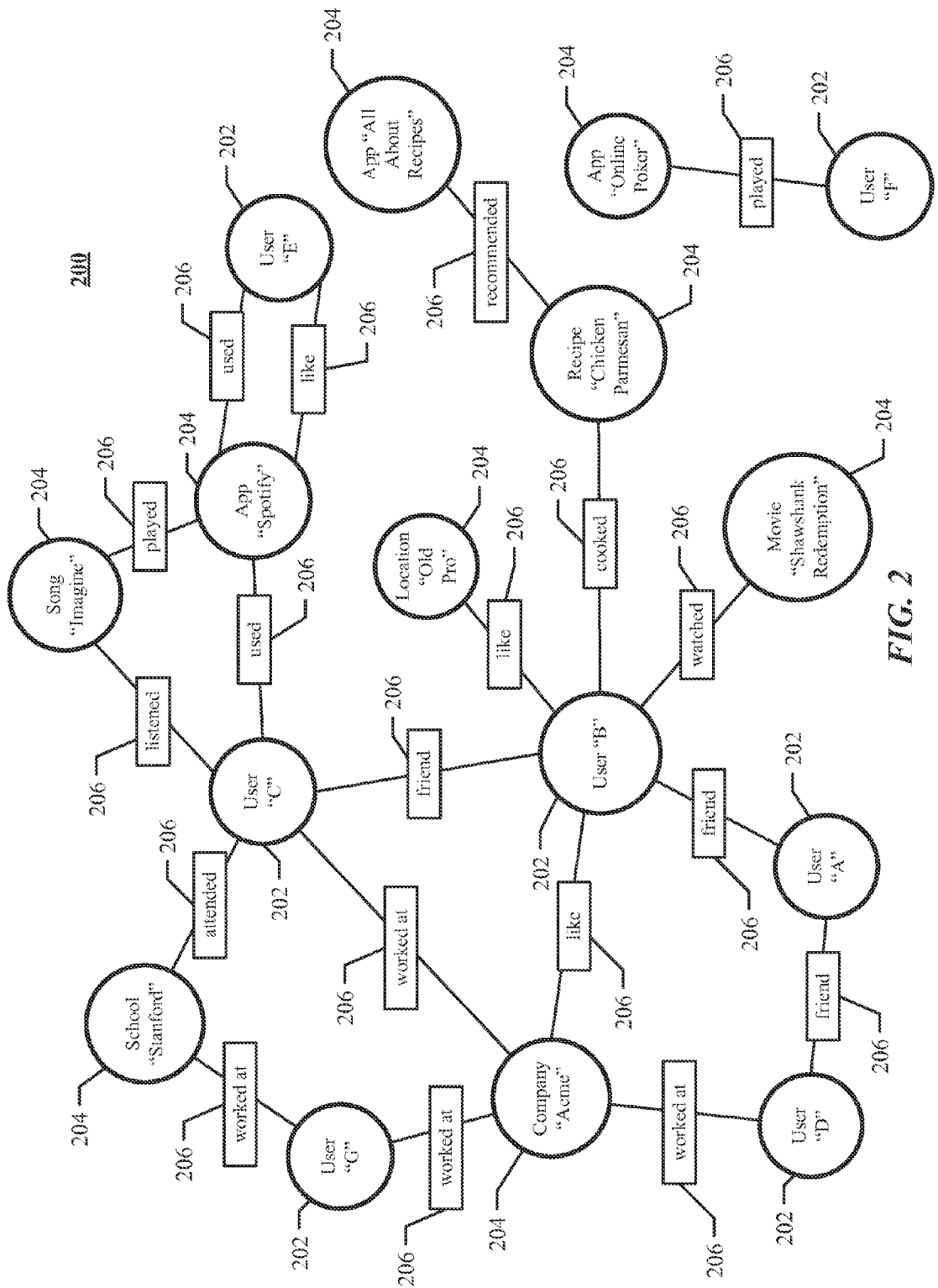
FIG. 2 illustrates an example social graph.

FIG. 2 illustrates an example social graph 200. In particular embodiments, the social-networking system 160 may store one or more social graphs 200 in one or more data stores. In particular embodiments, the social graph 200 may include multiple nodes—which may include multiple user nodes 202 or multiple concept nodes 204—and multiple edges 206 connecting the nodes. The example social graph 200 illustrated in FIG. 2 is shown, for didactic purposes, in a two-dimensional visual map representation. In particular embodiments, a social-networking system 160, a client system 130, or a third-party system 170 may access the social graph 200 and related social-graph information for suitable applications. The nodes and edges of the social graph 200 may be stored as data objects, for example, in a data store (such as a social-graph database). Such a data store may include one or more searchable or queryable indexes of nodes or edges of the social graph 200.

In particular embodiments, a user node 202 may correspond to a user of the social-networking system 160. As an example and not by way of limitation, a user may be an individual (human user), an entity (e.g., an enterprise, business, or third-party application), or a group (e.g., of individuals or entities) that interacts or communicates with or over the social-networking system 160. In particular embodiments, when a user registers for an account with the social-networking system 160, the social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with the social-networking system 160. In particular embodiments, a user node 202 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including the social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in the social graph 200 may represent or be represented by a webpage (which may be referred to as a "profile page"). Profile pages may be hosted by or accessible to the social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in the social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 206 connecting the first user's user node 202 to the second user's user node 202 in the social graph 200 and store edge 206 as social-graph information in one or more of data stores 164. In the example of FIG. 2, the social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, the social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, the social-networking system 160 may create an edge 206 between a user node 202 and a concept node 204 in the social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to the social-networking system 160 a message indicating the user's liking of the concept associated with the concept-profile page. In response to the message, the social-networking system 160 may create an edge 206 between user node 202 associated with the user and concept node 204, as illustrated by "like" edge 206 between the user and concept node 204. In particular embodiments, the social-networking system 160 may store an edge 206 in one or more data stores. In particular embodiments, an edge 206 may be automatically formed by the social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Location Information

In particular embodiments, the social-networking system 160 may determine a geographic location (hereinafter also simply "location") of an object (e.g., a user, a concept, or a mobile-client system 130 associated with a user or concept). The location of an object may be identified and stored as a street address (e.g., "1601 Willow Road"), a set of geographic coordinates (latitude and longitude), a reference to another location or object (e.g., "the coffee shop next to the train station"), a reference to a map tile (e.g., "map tile 32"), or using another suitable identifier. In particular embodiments, the location of an object may be provided by a user of an online social network. As an example and not by way of limitation, a user may input his location by checking-in at the location or otherwise providing an indication of his location. As another example and not by way of limitation, a user may input the location of a concept (e.g., a place or venue) by accessing the profile page for the concept and entering the location information (e.g., the stress address) of the concept. In particular embodiment, the location of a mobile-client system 130 equipped with cellular, Wi-Fi, GPS, or other suitable capabilities may be identified with geographic-positioning signals. As an example and not by way of limitation, a mobile-client system 130 may include one or more sensors that may facilitate geo-location functionalities of the system. Processing of sensor inputs by the mobile-client system 130 with one or more sensor devices (for example, processing a GPS sensor signal and displaying in the device's graphical user interface a map of a location corresponding to the GPS sensor signal) may be implemented by a combination of hardware, software, and/or firmware (or device drivers). Geographic-positioning signals may be obtained by cell tower triangulation, Wi-Fi positioning, or GPS positioning. In particular embodiments, a geographic location of an Internet-connected computer can be identified by the computer's IP address. A mobile-client system 130 may also have additional functionalities incorporating geographic-location data of the device, such as, for example, providing driving directions, displaying a map of a current location, or providing information of nearby points of interest such as restaurants, gas stations, etc. As an example and not by way of limitation, a web browser application on the mobile-client system 130 may access a mapping library (e.g., via a function call) that generates a map containing a GPS location obtained by a device driver interpreting a GPS signal from a GPS sensor, and display the map in the web browser application's graphical user interface. In particular embodiments, the location of a user may be determined from a search history associated with the user. As an example and not by way of limitation, if a particular user has previously queried for objects in a particular location, the social-networking system 160 (or the search-engine system 170) may assume that the user is still at that particular location. Although this disclosure describes determining the location of an object in a particular manner, this disclosure contemplates determining the location of an object in any suitable manner.

In particular embodiments, the social-networking system 160 may maintain a database of information relating to locations. The social-networking system 160 may also maintain meta information about particular locations, such as, for example, photos of the location, advertisements, user reviews, comments, "check-in" activity data, "like" activity data, hours of operation, or other suitable information related to the location. In particular embodiments, a location may correspond to a concept node 204 in a social graph 200 (such as, for example, as described previously or as described in U.S. patent application Ser. No. 12/763,171, which is incorporated by reference herein). The social-networking system 160 may allow users to access information regarding a location using a client application (e.g., a web browser or other suitable application) hosted by a mobile-client system 130. As an example and not by way of limitation, social-networking system 160 may serve webpages (or other structured documents) to users that request information about a location. In addition to user profile and location information, the system may track or maintain other information about the user. As an example and not by way of limitation, the social-networking system 160 may support geo-social-networking functionality including one or more location-based services that record the user's location. As an example and not by way of limitation, users may access the geo-social-networking system using a special-purpose client application hosted by a mobile-client system 130 of the user (or a web- or network-based application using a browser client). The client application may automatically access GPS or other geo-location functions supported by the mobile-client system 130 and report the user's current location to the geo-social-networking system. In addition, the client application may support geo-social networking functionality that allows users to "check-in" at various locations and communicate this location to other users. A check-in to a given location may occur when a user is physically located at a location and, using a mobile-client system 130, access the geo-social-networking system to register the user's presence at the location. The social-networking system 160 may automatically check-in a user to a location based on the user's current location and past location data (such as, for example, as described in U.S. patent application Ser. No. 13/042,357, which is incorporated by reference herein). In particular embodiments, the social-networking system 160 may allow users to indicate other types of relationships with respect to particular locations, such as "like," "fan," "worked at," "recommended," "attended," or another suitable type of relationship. In particular embodiments, "check-in" information and other relationship information may be represented in the social graph 200 as an edge 206 connecting the user node 202 of the user to the concept node 204 of the location.

Mobile Clients

Figure 3:
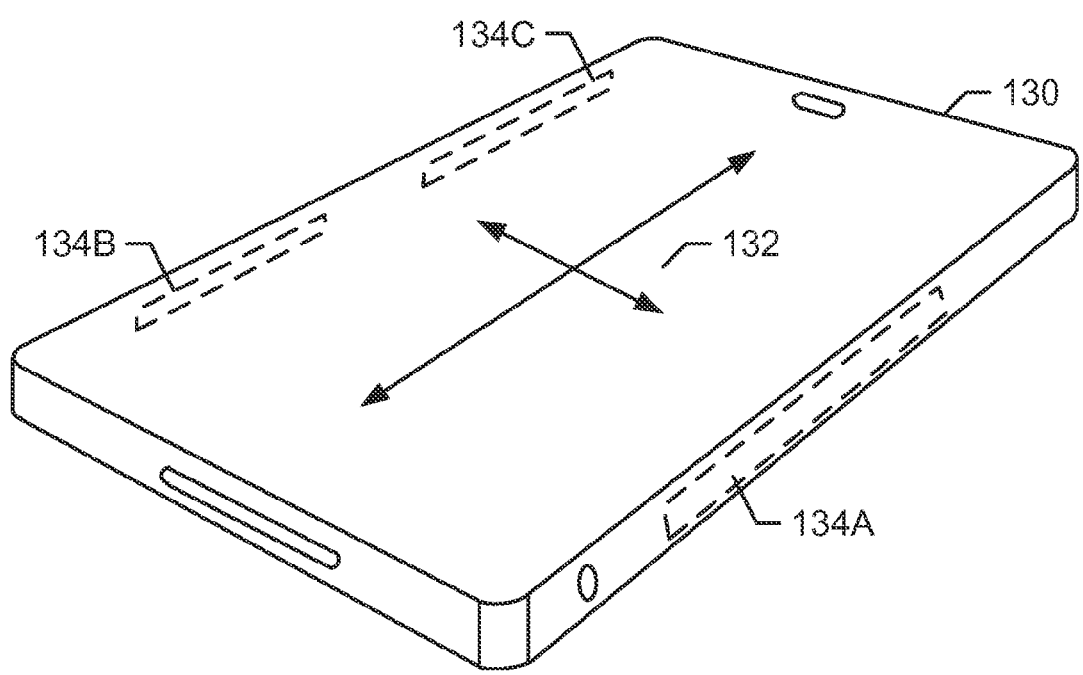
FIG. 3 illustrates an example mobile client system 130.

FIG. 3 illustrates an example mobile client system 130. This disclosure contemplates mobile client system 130 taking any suitable physical form. In particular embodiments, mobile client system 130 may be a computing system as described below. As example and not by way of limitation, mobile client system 130 may be a single-board computer system (SBC) (such as, for example, a computer-on-module (COM) or system-on-module (SOM)), a laptop or notebook computer system, a mobile telephone, a smartphone, a personal digital assistant (PDA), a tablet computer system, or a combination of two or more of these. In particular embodiments, mobile client system 130 may have a touch sensor 132 as an input component. In the example of FIG. 3, touch sensor 132 is incorporated on a front surface of mobile client system 130. In the case of capacitive touch sensors, there may be two types of electrodes: transmitting and receiving. These electrodes may be connected to a controller designed to drive the transmitting electrodes with electrical pulses and measure the changes in capacitance from the receiving electrodes caused by a touch or proximity input. In the example of FIG. 3, one or more antennae 134A-B may be incorporated into one or more sides of mobile client system 130. Antennae 134A-B are components that convert electric current into radio waves, and vice versa. During transmission of signals, a transmitter applies an oscillating radio frequency (RF) electric current to terminals of antenna 134A-B, and antenna 134A-B radiates the energy of the applied the current as electromagnetic (EM) waves. During reception of signals, antennae 134A-B convert the power of an incoming EM wave into a voltage at the terminals of antennae 134A-B. The voltage may be transmitted to a receiver for amplification.

In particular embodiments, mobile client system 130 many include a communication component coupled to antennae 134A-B for communicating with an Ethernet or other wire-based network or a wireless NIC (WNIC), wireless adapter for communicating with a wireless network, such as for example a WI-FI network or modem for communicating with a cellular network, such third generation mobile telecommunications (3G), or Long Term Evolution (LTE) network. This disclosure contemplates any suitable network and any suitable communication component 20 for it. As an example and not by way of limitation, mobile client system 130 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As another example, mobile client system 130 may communicate with a wireless PAN (WPAN) (such as, for example, a BLUETOOTH WPAN), a WI-FI network, a WI-MAX network, a cellular telephone network (such as, for example, a Global System for Mobile Communications (GSM), 3G, or LTE network), or other suitable wireless network or a combination of two or more of these. Mobile client system 130 may include any suitable communication component for any of these networks, where appropriate.

In particular embodiments, the communication component coupled to antennae 134A-B mobile client system 130 may be configured to determine location data based on global positioning system (GPS) signals, cellular triangulation, wireless hotspots, or any suitable methods for determining location data. In particular embodiments, the location service of mobile client system 130 may use one or more methods of location determination, such as for example, using the location of one or more cellular towers, crowd-sourced location information associated with a WI-FI hotspot, or a GPS function of mobile client system 130. As an example and not by way of limitation, the application may use GPS data as the primary source of location information depending at least in part on whether mobile client system 130 is able to acquire GPS data within a pre-determined period of time. As another example, if mobile client system 130 is unable to acquire the GPS data within the pre-determined sampling duration, the application may use the location determined using one or more cellular towers or WI-FI hotspots. Although this disclosure describes a location service using particular methods of location determination, this disclosure contemplates a location service using any suitable method or combination of methods of location detection.

Travel Recommendations and Travel Itinerary Generation

In particular embodiments, the social-networking system 160 may generate travel recommendations for a user that the social-networking system 160 has determined is or will be traveling to a particular geographic location. Generally, the social-networking system 160 may gather and analyze location data and social-graph data for users of the social network in order to provide "travel agent" and "travel log"-like functionalities. As an example and not by way of limitation, when users of the social-networking system 160 go traveling, they frequently post and upload information relating to their travels, including information on points of interest they visited and recommendations and reviews of these points of interest, restaurant recommendations, and general travel tips and recommendations. As another example and not by way of limitation, the social-networking system 160 may have access to information relating to each of these users, including, for example, personal information (e.g., personal preferences/interests such as particular interests in outdoors activities, certain historical periods, etc.; family information such as size of family, number of children, etc.; and historical information such as previous vacations and places/tourist attractions visited); social network information (e.g., any and all information relating to other users that are part of the user's social network, in addition to information relating to users of the social-networking system 160 at large); and location information (e.g., including GPS information of where the user is or has been, and information on what route these users took for a trip to obtain information on optimal route determination/selection). In particular embodiments, the social-networking system 160 may aggregate data from all of these sources of information in order to leverage the data to generate travel recommendations. Although this disclosure describes gathering and analyzing data for users of the social-networking system 160 in a particular manner, this disclosure contemplates gathering and analyzing data for users of the social-networking system 160 in any suitable manner.

Figure 4:
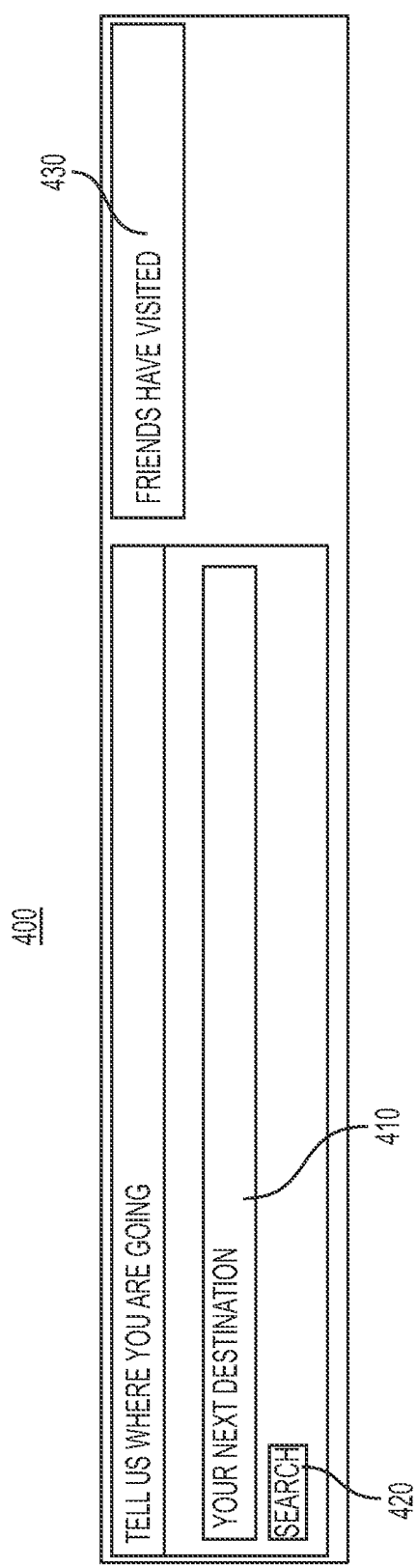
FIG. 4 illustrates an example user interface for requesting travel information from a first user of the social-networking system.

In particular embodiments, the social-networking system 160 may receive, from a client system (e.g., the mobile client system 130) of a first user of the online social network, an indication that the first user is traveling to a first geographic location. In particular embodiments, the indication that the first user is traveling to the first geographic location is determined based on one or more of accessing user-provided information from the online social network indicating that the user is traveling to the first geographic location, and analyzing a current geo-location information of the user. In particular embodiments, the social-networking system 160 may access user-provided information from the online social network. As an example and not by way of limitation, content inputted by the first user may include one or more of posts, uploads, reshares, or comments. As an example and not by way of limitation, a user may include in a post that she is going to Paris, France between the dates of March 1 through March 10. As another example and not by way of limitation, a user may view another user's uploaded pictures of Paris, France, and post a comment indicating that she is also traveling to Paris, France (e.g., between the dates of March 1 through March 10). As yet another example and not by way of limitation, a user may submit a query to the social-networking system 160 by, for example, selecting a query input or inputting text into query field. As shown in FIG. 4, a user interface 400 associated with generating the travel recommendations for the user (e.g., requesting information such as "tell us where you are going") may include a "destination" search input area 410 (e.g., requesting the user to input "your next destination") and a "search" button 420. In addition, as shown in FIG. 4, user interface 400 may also include an area 430 labeled "friends have visited," for displaying, for example, geographic locations (e.g., one or more points of interest) that friends of the user (e.g., as determined based on social graph information, discussed below) have visited (e.g., determined based on social-networking information).

Figure 5:
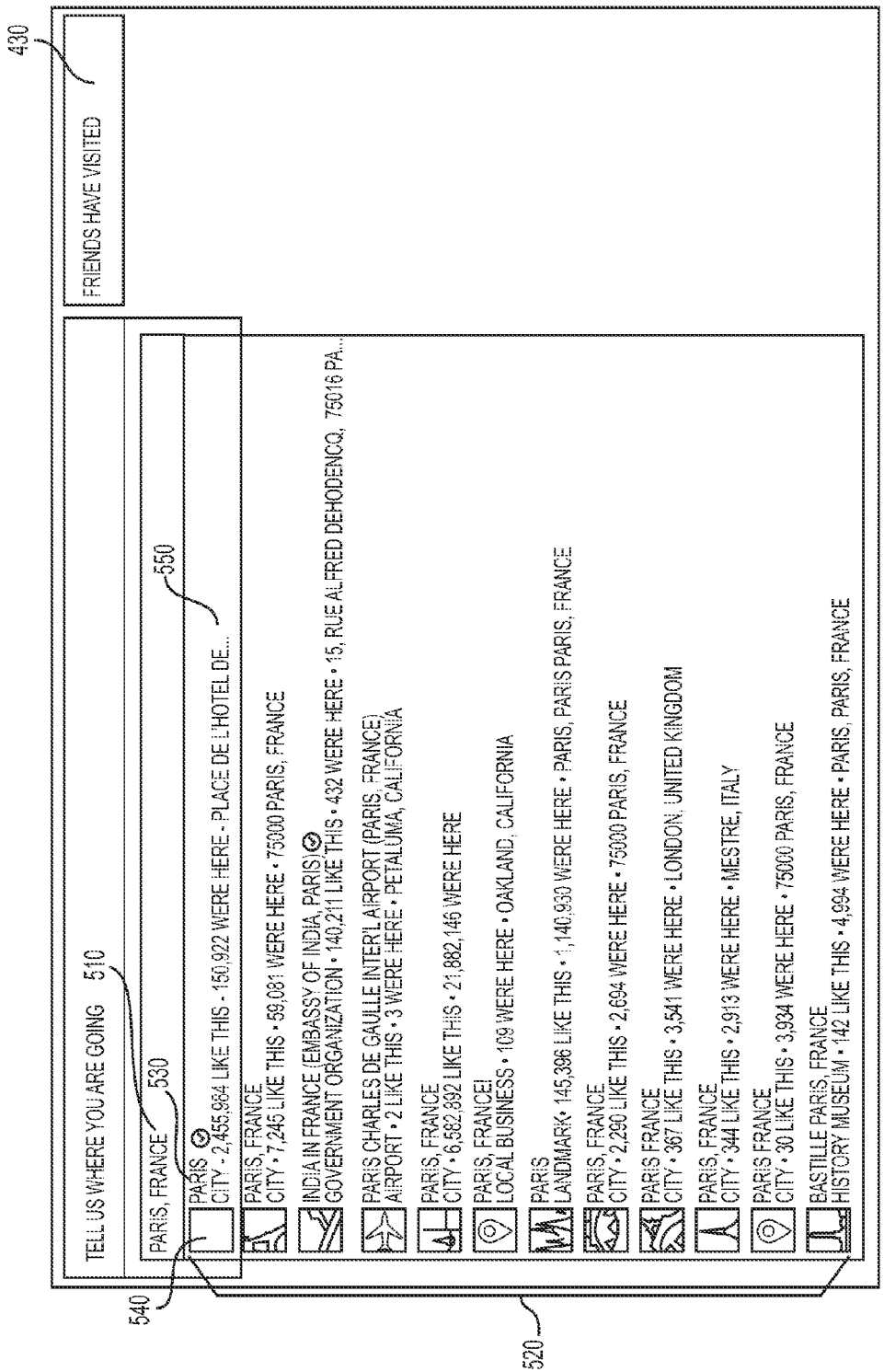
FIG. 5 illustrates an example user interface for populating results for a travel location based on an input of a first user of the social-networking system.

In particular embodiments, a user of an online social network may search for information relating to a specific subject matter (e.g., users, concepts, external content or resource) by providing a short phrase describing the subject matter, often referred to as a "search query," to a search engine. The query may be an unstructured text query and may comprise one or more text strings (which may include one or more n-grams). In general, a user may input any character string into a query field to search for content on the social-networking system 160 that matches the text query. The social-networking system 160 may then search a data store 164 (or, in particular, a social-graph database) to identify content matching the query. The search engine may conduct a search based on the query phrase using various search algorithms and generate search results that identify resources or content (e.g., user-profile pages, content-profile pages, or external resources) that are most likely to be related to the search query. To conduct a search, a user may input or send a search query to the search engine. In response, the search engine may identify one or more resources that are likely to be related to the search query, each of which may individually be referred to as a "search result," or collectively be referred to as the "search results" corresponding to the search query. The identified content may include, for example, social-graph elements (i.e., user nodes 202, concept nodes 204, edges 206), profile pages, external webpages, or any combination thereof. The social-networking system 160 may then generate a search-results page with search results corresponding to the identified content and send the search-results page to the user. The search results may be presented to the user, often in the form of a list of links on the search-results page, each link being associated with a different page that contains some of the identified resources or content. In particular embodiments, each link in the search results may be in the form of a Uniform Resource Locator (URL) that specifies where the corresponding page is located and the mechanism for retrieving it. The social-networking system 160 may then send the search-results page to the web browser 132 on the user's client system 130. The user may then click on the URL links or otherwise select the content from the search-results page to access the content from the social-networking system 160 or from an external system (such as, for example, a third-party system 170), as appropriate. The resources may be ranked and presented to the user according to their relative degrees of relevance to the search query. Although this disclosure describes querying the social-networking system 160 in a particular manner, this disclosure contemplates querying the social-networking system 160 in any suitable manner. In connection with search queries and search results, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, and U.S. patent application Ser. No. 12/978,265, filed 23 Dec. 2010, which are incorporated by reference. More information on element detection and parsing queries may be found in U.S. patent application Ser. No. 13/556,072, filed 23 Jul. 2012, U.S. patent application Ser. No. 13/731,866, filed 31 Dec. 2012, and U.S. patent application Ser. No. 13/732,101, filed 31 Dec. 2012, each of which is incorporated by reference. More information on keyword queries may be found in U.S. patent application Ser. No. 14/244,748, filed 3 Apr. 2014, U.S. patent application Ser. No. 14/470,607, filed 27 Aug. 2014, and U.S. patent application Ser. No. 14/561,418, filed 5 Dec. 2014, each of which is incorporated by reference As shown in FIG. 5, once a user input is received from the user (e.g., "Paris, France"), user interface 400 may display one or more search results 520 that match the user input (e.g., based on searching for content on the social-networking system 160 that matches a text query, as described above). In particular embodiments, as shown in FIG. 5, each search result 520 may include a name of the geographic location 530 (e.g., "Paris"; "Paris, France"; "India in France (Embassy of India, Paris)"; etc., that may correspond to a concept node 204 on the social graph 200, as discussed below); an image 540 representative of the geographic location 530 (e.g., that may be an image associated with the corresponding concept node 204 of the geographic location); and additional information 550 associated with the geographic location. As an example and not by way of limitation, the additional information 550 may include a description of the geographic location (e.g., "city"; "local business"; "history museum"; etc.), an indication of how many "likes" among all users of the online social network, an indication of how many people have been at (e.g., have "checked-in" at) the geographic location, and one or more points of interest associated with the geographic location. Although this disclosure describes a user interface and information presented on this user interface in particular manner, this disclosure contemplates a user interface and the information presented on this user interface in any suitable manner.

In particular embodiments, the social-networking system 160 may analyze the current geo-location information of the user by collecting GPS information. As an example and not by way of limitation, the social-networking system 160 may determine when the first user is traveling by collecting GPS information for a user using the GPS sensor of the mobile client system 130 and then analyzing the GPS information in connection with data on the user's typical locations and routes traveled to determine whether the user is outside their normal routine, and thus likely traveling. In particular embodiments, the analyzing the current geo-location information of the first user may include generating a location history associated with the first user, determining a plurality of hotspots associated with the first user based on the location history, and determining that a current geographic location of the first user is more than a threshold distance from one or more of the plurality of hotspots. As an example and not by way of limitation, the social-networking system 160 may determine whether the current location of the first user corresponds to a determined "hotspot" for the first user. As an example and not by way of limitation, the first user's hotspots may include her residence, her school, her place of work, and other places the user may be frequently located at. If the first user is at or nearby (e.g., within a threshold distance) to a hotspot, the social-networking system 160 may determine that the user is within her normal routine, and thus unlikely to be traveling (e.g., vacationing). On the other hand, if the first user is located at a relatively unusual location (e.g., at a geographic location that is more than the threshold distance from a hotspot), the social-networking system 160 may determine that the first user is outside her normal routine, and thus likely to be traveling. Although this disclosure describes determining hotspots in a particular manner, this disclosure contemplates determining hotspots in any suitable manner. The determination of hotspots is further described in U.S. patent application Ser. No. 14/323,915, which is incorporated herein by reference.

In particular embodiments, the social-networking system 160 may contain a database containing a location history associated with one or more users (e.g., including the first user) of the social-networking system 160. In particular embodiments, the database may contain a separate location history for each user. As an example and not by way of limitation, the location history may comprise one or more location updates, wherein each location update represents each instance of the mobile client system 130 of the first user sending its location to the social-networking system 160. In particular embodiments, the location history may contain the user's location determined through other sources. As an example and not by way of limitation, the location history may contain location and time entries derived from the user checking in via the online social network at a particular location at a particular time, even if the mobile client system 130 of the user did not report its location at that time. Other examples of providing time and location information may include being the user being tagged in a photograph that contains metadata pertaining to the time and location where it was shot. The user may be tagged at a later time than when the photo and associated metadata was uploaded to the social-networking system 160, and the location history would update the new location based on the tag in the proper time slot. In particular embodiments, the social-networking system 160 may weigh location updates determined through background location services equally with location updates provided through check-in activities or tags of the user. In particular embodiments, the social-networking system 160 may weigh the check-in activities or tags of the user greater than background location updates. As an example and not by way of limitation, if the location update for a particular user indicates that the user is at the Caltrain Station at 4th St. and King St. in San Francisco, Calif., but the user checks in at AT&T Park two blocks away from the Caltrain Station, social-networking system 160 may determine that the background location update is in error, override the background location update and determine that the user's location at that time is actually AT&T Park.

In particular embodiments, the location history may include one or more geographic locations associated with the user, in addition to one or more time stamps corresponding to each of the geographic locations. In particular embodiments, the social-networking system 160 may store the location history as a set of location updates, wherein each location update comprises geographic coordinates and a time stamp associated with the geographic coordinates. In particular embodiments, the time stamp associated with a location update may be a time range between the time of the location update and the time of the subsequent update. As an example and not by way of limitation, if a user sends a first location update at 8:00 AM from a first location, and then sends a location update at 8:15 AM from a second location, social-networking system 160 may record the first user as being at the first location from 8:00 AM to 8:15 AM. In particular embodiments, if the user has been stationary for multiple location updates, then the social-networking system 160 may combine multiple location updates into a single location update for the time range that the user was stationary. As an example and not by way of limitation, if the user continues to send location updates every 15 minutes from the second location from 8:15 AM to 8:00 PM, the social-networking system 160 may consolidate the multiple entries to one location update from the second location with a time stamp of 8:15 AM-8:00 PM.

In particular embodiments, the social-networking system 160 may record each location by their geographic coordinates. In particular embodiments, the social-networking system 160 may determine one or more places associated with one or more of the geographic coordinates. As an example and not by way of limitation, for a set of location updates in a location history of the first user, the social-networking system 160 may determine three sets of geographic coordinates. The social-networking system 160 may additionally determine that the first set of coordinates corresponds to the Stanford Shopping Center in Palo Alto, Calif., based on place mapping information known to the social-networking system 160. For the second set of coordinates, the social-networking system 160 may determine that the user is at AT&T Park in San Francisco, Calif., based on the user being tagged in a photo also tagged with AT&T Park at the same time. For the third set of coordinates, the social-networking system 160 may determine that the first user is at San Francisco International Airport, based on the user checking-in at the airport. In particular embodiments, the social-networking system 160 may store both the geographic coordinates and associated places for each location update in the location history of the first user. In particular embodiments, the location history of a particular user may be used to determine if the recent location history of the user is known to the social-networking system 160. As discussed above, if the recent location history is not known, the social-networking system 160 may determine that the first user is outside her normal routine, and thus likely to be traveling. Although this disclosure describes maintaining a database containing a location history associated with one or more users in a particular manner, this disclosure contemplates maintaining a database containing a location history associated with one or more users in any suitable manner. The determination of a user's recent location history is further described in U.S. patent application Ser. No. 14/323,915, which is incorporated herein by reference.

In particular embodiments, the social-networking system 160 may identify one or more second geographic locations within a threshold distance from the first geographic location, the one or more second geographic locations being determined based on a travel-recommendation model associated with the first user. When the social-networking system 160 determines that a user is or will be traveling to a particular location (e.g., the first geographic location) based on, for example, the user's GPS information, information gleamed from the user's posts/uploads, and/or an inputted search query (as discussed above), the social-networking system 160 may leverage this information, in addition to the information obtained from all users globally of the social-networking system 160, in order to provide travel recommendations for points of interest (e.g., the one or more second geographic locations) for the particular geographic location, including tourist attractions, popular restaurants, and other nearby points of interest.

In particular embodiments, the travel-recommendation model may include aggregated user information from the online social network associated with the first user. As an example and not by way of limitation, the aggregated user information associated with the first user includes user preferences of the first user (e.g., personal preferences and/or interests such as particular interest in outdoors activities, certain historical periods, certain types of museums, etc.), personal information of the first user (e.g., family information such as size of family, number of children, etc.), historical activities of the first user associated with the online social network (e.g., posts, uploads, reshares, and comments of their own interests and activities, in addition to other user's interests and activities), geo-location information and travel information of the first user (e.g., previous vacations and places and/or tourist attractions previously visited, etc.), and social-networking information of the first user (e.g., any and all other information relating to other users that are part of the user's social network, in addition to information relating to users of the social network at large). As an example and not by way of limitation, the social-networking system 160 can extract travel information from the first user's uploads and/or posts based on classifying the data obtain from these sources of information as relating to sightseeing and traveling (by, for example, keyword, label, tag, and/or sentiment analysis). As an example and not by way of limitation, the social-networking system 160 may tailor the travel recommendations based on knowledge of specific characteristics of the user such as the user's age, interests, travel interests, knowledge of the area, and other relevant user information.

In particular embodiments, the travel-recommendation model may include aggregated travel information from the online social network associated with one or more second users of the online social network who have traveled to the first geographic location. As an example and not by way of limitation, in the example discussed above of the user input of "Paris, France" as shown in FIG. 5, one or more search results 520 includes additional information 550 that indicates how many second users of the online social network have been to (e.g., traveled to) each of the geographic locations 530 listed in search results 520. Specifically, for the first listed result of the city of "Paris," additional information 550 indicates that 150,922 other users (i.e., second users) have been to the city of Paris. In particular embodiments, the aggregated travel information associated with the one or more second users includes content inputted by the one or more second users, and the content is associated with the one or more second geographic locations (e.g., points of interest). As an example and not by way of limitation, the points of interest may be determined based on content inputted by the second users (e.g., including users who are part of the first user's social network as friends of the first user), which may include the second users' indication that they have been to specific points of interest, posting of content relating to specific points of interest, posting of pictures relating to specific points of interest, and commenting on other user's posts relating to points of interest (e.g., posting substantive comments and/or "liking" a post).

Figure 6:
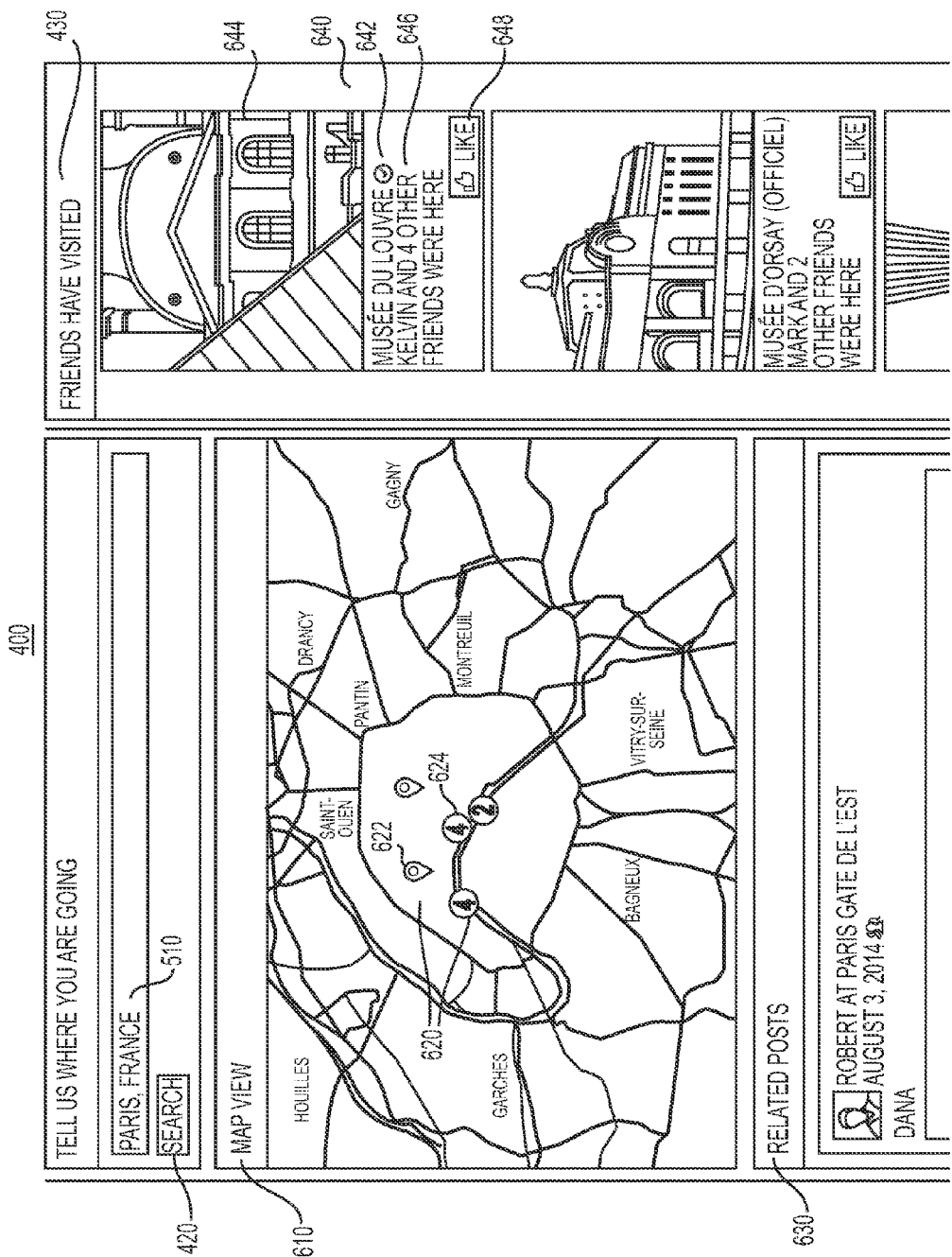
FIG. 6 illustrates an example user interface including a map of points of interest based on an input of a first user of the social-networking system.
Figure 7:
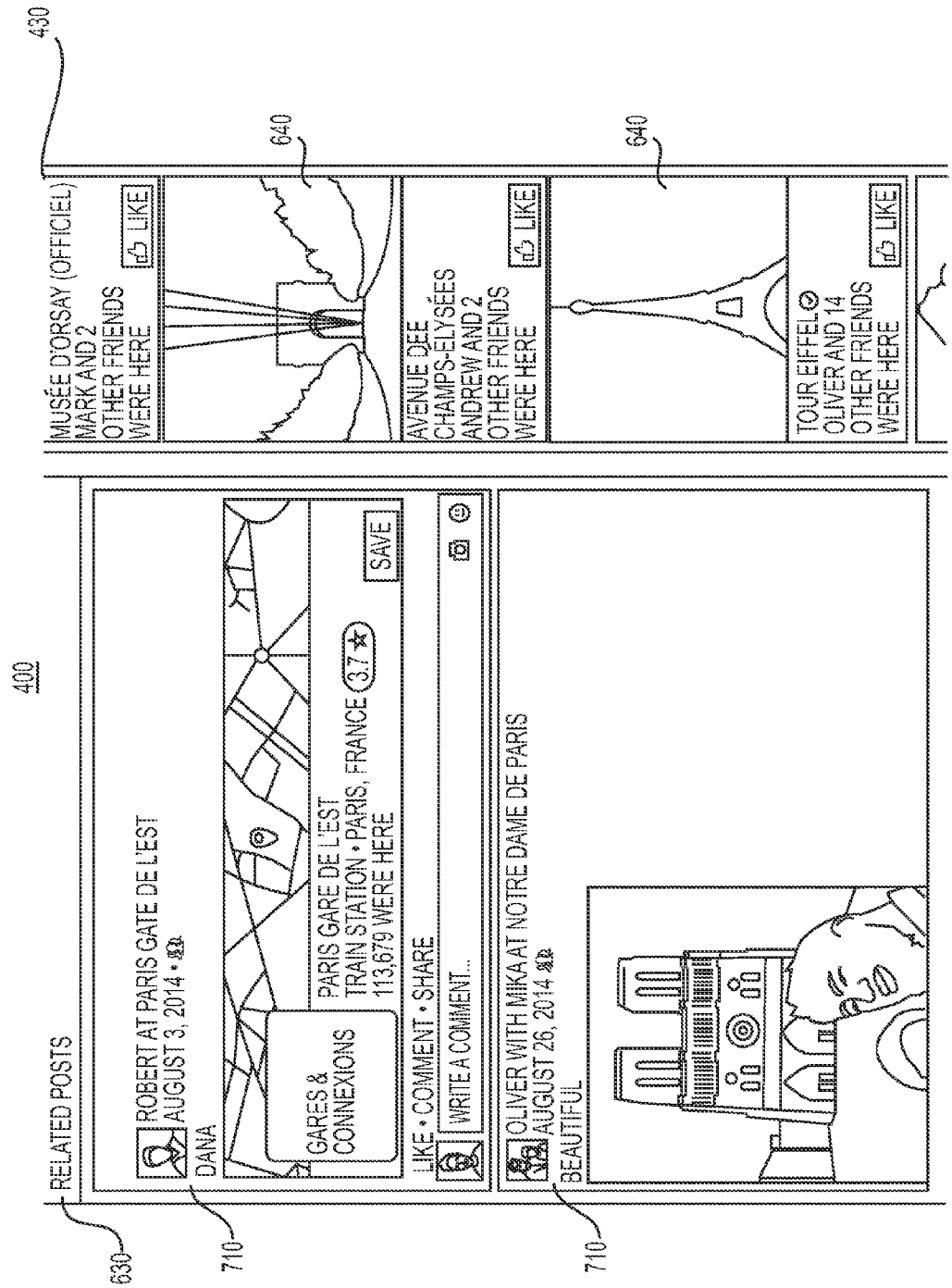
FIGS. 7-11 illustrates example user interfaces including posts of second users of the social-networking system.
Figure 8:
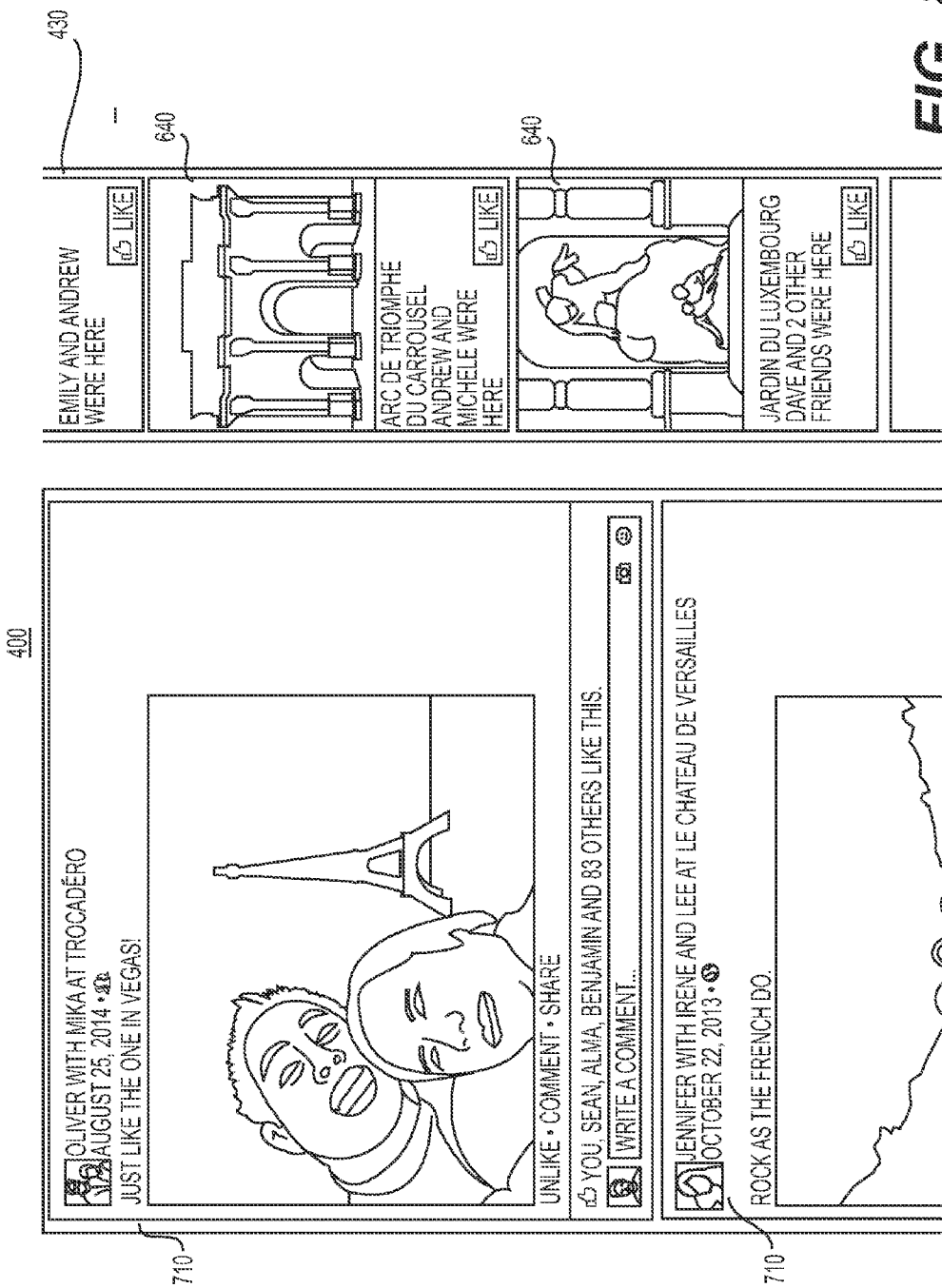

In particular embodiments, as shown in area 430 labeled "friends have visited" of FIGS. 6-9, a list of points of interest 640 for Paris, France may be generated based on second users' indication that they have been to specific points of interest. Specifically, the list of points of interest 640 located in Paris, France, may include the Musée du Louvre, the Musée D'Orsay, the Avenue Dee Champs-Elysées, the Tour Eiffel, the Arc de Triomphe du Carrousel, and the Jardin du Luxembourg. In addition, for each of the points of interest, the social-networking system 160 may determine and present the friends of the first user that have been to the point of interest. As an example and not by way of limitation, as shown in FIG. 6, five friends of the first user have been to the Musée du Louvre (i.e., "Kevlin and 4 other friends"), and three friends of the first user have been to the Musée D'Orsay (i.e., "Mark and 2 other friends"). As another example and not by way of limitation, as shown in FIG. 7, three friends of the first user have been to the Avenue Dee Champs-Elysées (i.e., "Andrew and 2 other friends), and fifteen friends of the first user have been to the Tour Eiffel (i.e., "Oliver and 14 other friends). As yet another example and not by way of limitation, as shown in FIG. 8, two friends of the first user have been to the Arc de Triomphe du Carrousel (i.e., "Andrew and Michele"), and three friends of the first user have been to the Jardin du Luxembourg (i.e., Dave and 2 other friends).

Figure 9:
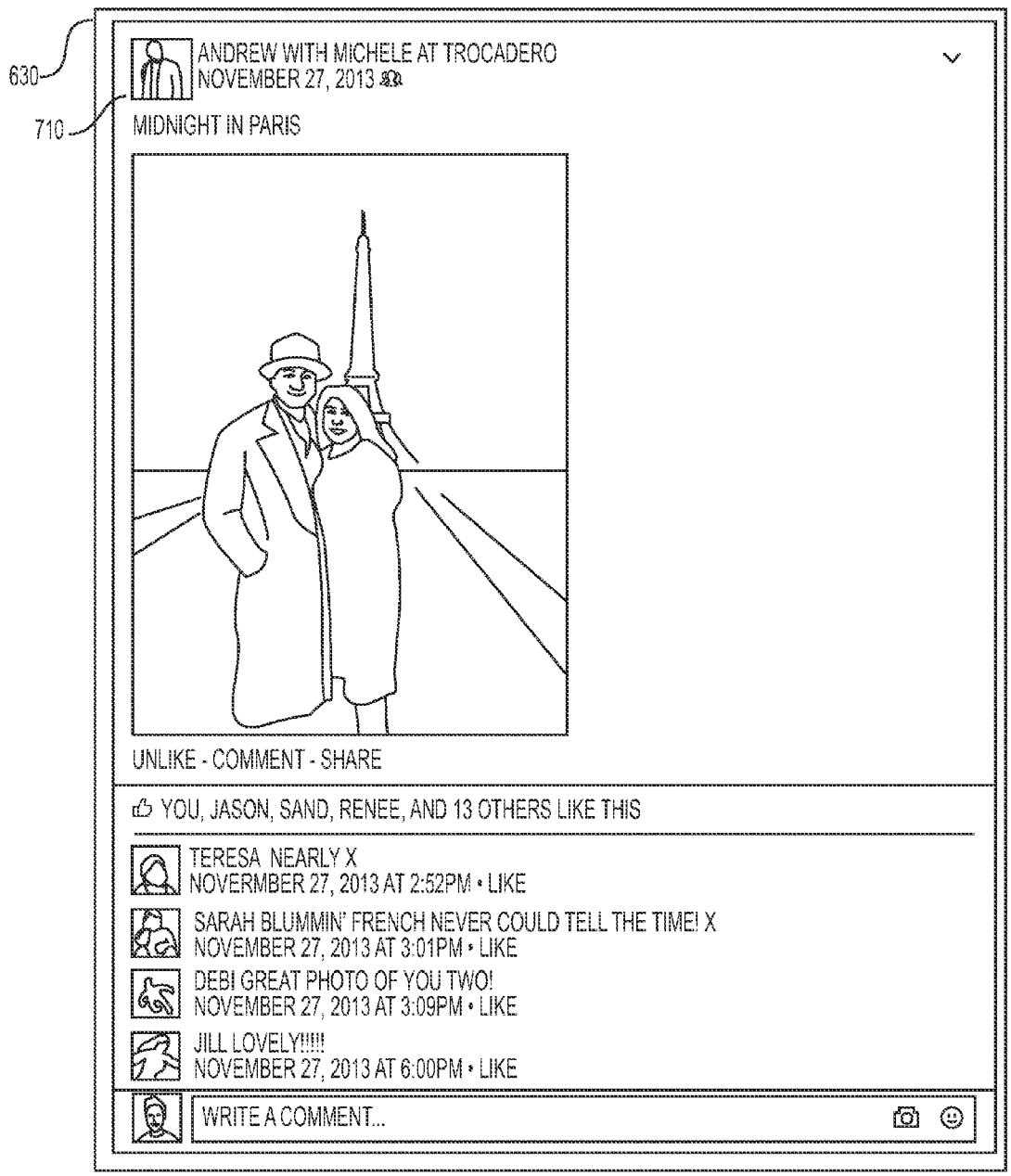
Figure 10:
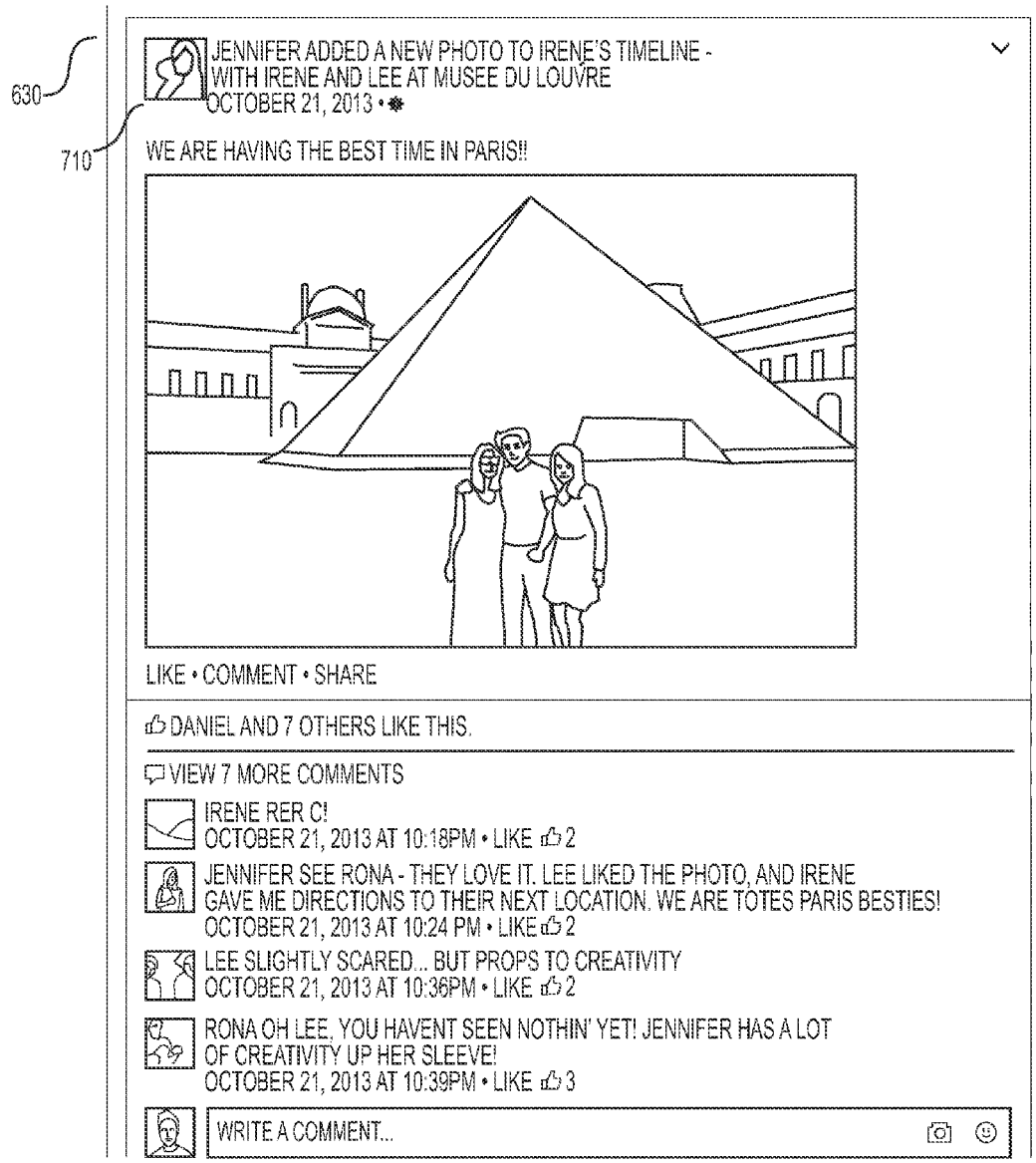
Figure 11:
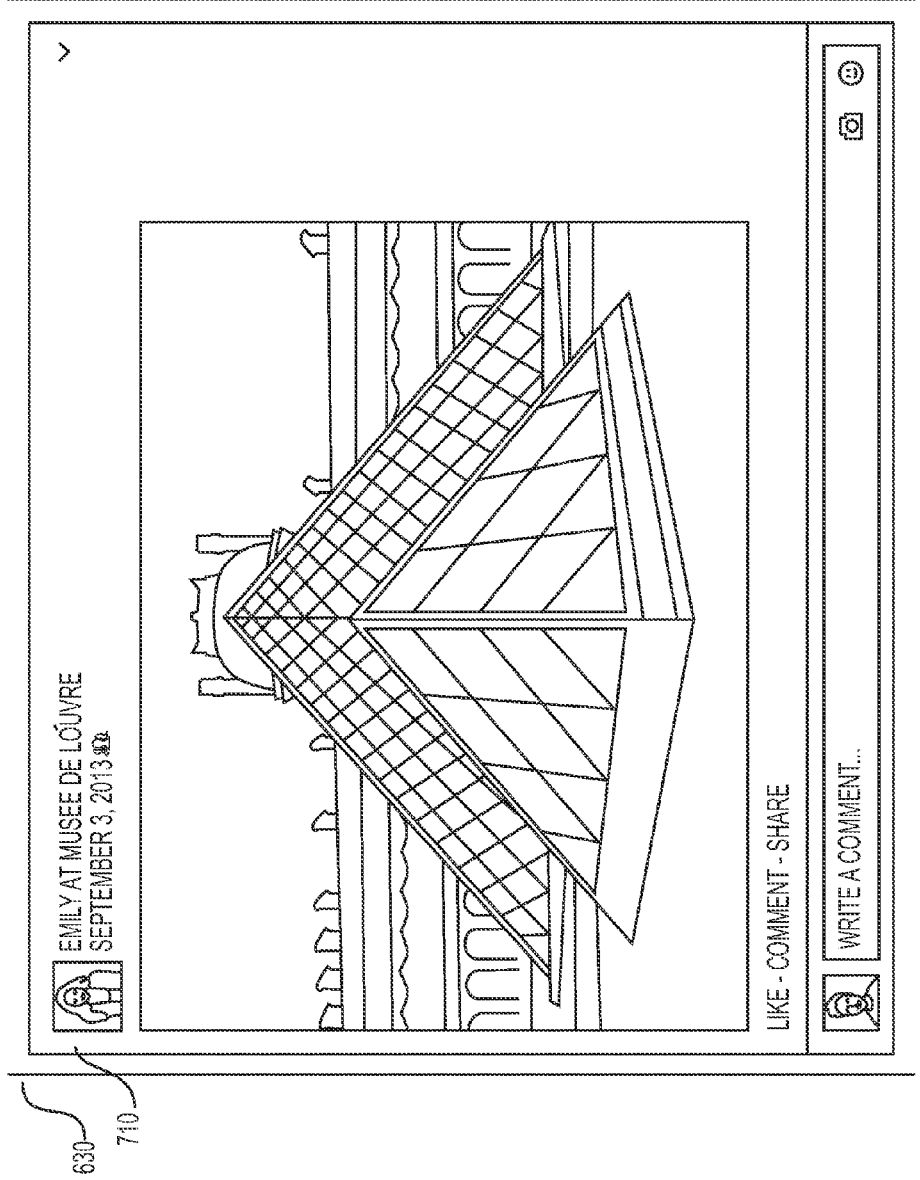

In particular embodiments, as shown in a related-posts section 630 of FIGS. 7-11, points of interest may also be generated based on second users' posting of content and/or pictures relating to specific points of interest. As an example and not by way of limitation, as shown in FIG. 7, the first user's friend Robert posted a post 710 relating to the Paris Gate de L'est, and the first user's friend Oliver posted a post 710 with a picture of himself and Mika at Notre Dame de Paris. As another example and not by way of limitation, as shown in FIG. 8, the first user's friend Oliver posted another post 710 with a picture of himself and Mika at the Trocadéro, and the first user's friend Jennifer posted a post 710 with a picture of herself, Irene, and Lee at Le Chateau de Versailles. As yet another example and not by way of limitation, as shown in FIG. 9, the first user's friend Andrew posted a post 710 with a picture of himself and Michele at the Trocadero. As yet another example and not by way of limitation, as shown in FIG. 10, the first user's friend Jennifer posted a post 710 with a picture of herself, Irene, and Lee at the Musée du Louvre. As yet another example, the first user's friend Emily posted a post 710 with a picture of the Musée du Louvre.

In particular embodiments, as shown in related-posts section 630 of FIGS. 8-10, points of interest may also be generated based on commenting on other user's posts relating to points of interest (e.g., posting substantive comments and/or "liking" a post). As an example and not by way of limitation, as shown in FIG. 8, the first user's friend Oliver's post 710 was liked by the first user and eighty-six other users. As another example and not by way of limitation, as shown in FIG. 9, the first user's friend Andrew's post 710 was liked the first user and sixteen other users. As yet another example and not by way of limitation, as shown in FIG. 10, the first user's friend Jennifer's post 710 was liked by either other users, and also included a plurality of substantive comments from other users of the social network, and some of these comments were then separately liked by other users.

In particular embodiments, the social-networking system 160 may analyze the content inputted by the one or more second users to categorize the content as relating to a particular activity (e.g., sightseeing, traveling, or other suitable activities) and the analysis being based on labeling information, tag information, or sentiment analysis of the content. As an example and not by way of limitation, features associated with content may be determined at least in part by applying one or more of the following analyses to the content: term-frequency analysis, term-frequency-inverse-document-frequency (TF-IDF) analysis, topic-extraction analysis, or sentiment analysis. Term-frequency analysis involves counting the number of occurrences of a term in a content object. In particular embodiments, the number of occurrences of a term may be normalized to prevent a bias towards longer content objects. A TF-IDF approach uses a statistical measure to evaluate how important a word or feature is to a document in a collection of documents (e.g., how important a word is to a comment in a collection of comments associated with a training set of objects). In particular embodiments, social-networking system 160 may use a topic-extraction mechanism or system to determine a corresponding feature by identifying one or more nodes from social graph 200 that closely match the content object. In particular embodiments, identifying features may be based at least in part on a sentiment analysis of comments. More information on classifying content may be found in U.S. patent application Ser. No. 14/556,854, filed 1 Dec. 2014, which is incorporated by reference. More information on topic extraction may be found in U.S. patent application Ser. No. 13/167,701, filed 23 Jun. 2011, which is incorporated by reference. More information on sentiment analysis may be found in U.S. patent application Ser. No. 14/023,136, filed 10 Sep. 2013, which is incorporated by reference. In particular embodiments, the content inputted by the one or more second users includes posts, uploads, reshares, and comments. In particular embodiments, the one or more second users of the online social network may include all users of the social-networking system 160, or only a subset of users (e.g., only the users who are "friend" connections with the first user, only the users who are first or second degree contacts with the first user, only the users who have been to a particular geographic location, or other suitable subset of second users). As an example and not by way of limitation, in the above-discussed example of Paris, France, as shown in FIGS. 6-11, the social-networking system 160 may determine that the points of interest for Paris, France (e.g., determined based on content inputted by the second users) include the Musée du Louvre, the Musée D'Orsay, the Avenue Dee Champs-Elysées, the Tour Eiffel, the Arc de Triomphe du Carrousel, the Jardin du Luxembourg, the Paris Gate de L'est, the Notre Dame de Paris, Le Chateau de Versailles, and the Trocadero. As another example and not by way of limitation, if the social-networking system 160 determines that the first user is traveling to Washington, D.C., the social-networking system 160 may recommend a collection of museums, landmarks, restaurants, and other points of interest to the first user based on a model (e.g., a recommendation model) built on the information collected from the first user herself, in addition to other second users of the social-networking system 160. Moreover, depending on the first user's travel interest and age, for example, the social-networking system 160 may present recommendations tailored to the first user and based on these other second users (e.g., which may include other users that are part of the first user's social network, other users in general who have visited Washington, D.C., etc.).

In particular embodiments, the social-networking system 160 may identify the one or more second geographic locations (e.g. points of interest) based on the travel-recommendation model. The travel-recommendation model may include one or more of an individual interpolation model, a clustering model, or a dynamic interpolation model. In particular embodiments, the individual interpolation model may be generated based on a weighted combination of at least one individual user interpolation model and a global user interpolation model. In particular embodiments, the individual user interpolation model may be determined for each of the one or more second users based on all travel information associated with the one or more second users. In particular embodiments, the global user interpolation model may be determined based on aggregated travel information for all users of the online social network who have traveled to the first geographic location. As an example and not by way of limitation, the individual user interpolation model may include an individual model for each distinct user that is trained based on data collected from the user, and a global user interpolation model that is created based on one or more specific criteria for limiting a group of users (e.g., based on all users who visit a specific location, a specific point-of-interest, or other similar group). In particular embodiments, when a new user is added and travel information is to be determined for the user, an individual user interpolation model may be generated for the user based on a weighed combination of one or more individual models of other users (e.g., selected based on affinity to the new user, or other social graph information) and the global user interpolation model (e.g., selected based on any of above-described criteria), and this individual interpolation model for the user is used to identify the one or more second geographic locations.

In particular embodiments, the clustering model may be generated based on clustering all users, or a portion of the users, of the online social network into a plurality of groups based on predetermined user characteristics. As an example and not by way of limitation, all users, or a portion of the users (e.g., a portion of users that live in a particular geographic area such as United States, California, etc., a portion of users that speak a particular language, a portion of users who all went to a particular school, or other suitable macro groupings), may be divided into groups such as user with families and young children, users who love outdoor activities, older users who enjoy more relaxing attractions, users who love to eat at Michelin-starred restaurants, and other suitable groups. In particular embodiments, a travel-recommendation group model may then be determined for each of these groups. As an example and not by way of limitation, the travel-recommendation group model may include information on what types of points of interest the member of that particular group would enjoy (e.g., for the group of older users who enjoy more relaxing attractions, the model may determine that museums and other similar points of interest would be of more interest to these users than night clubs or local concerts). An another example and not by way of limitation, the travel-recommendation group model may be specific to a geographic location (e.g., Paris, France), and may determine of list of points of interest that member of a particular group would be interested in. In particular embodiments, the social-networking system 160 may then determine the group that the first user should be identified with based on the predetermined user characteristics of the first user. As an example and not by way of limitation, if the user is determined to be young and has frequently going on outdoor trips in the past, the social-networking system 160 may determine that the user would be placed in the particular group of users who love outdoor activities. In particular embodiments, the social-networking system may then use the travel-recommendation group model associated with the particular group as the travel-recommendation model for the first user for identifying the one or more second geographic locations.

In particular embodiments, the dynamic interpolation model may be generated based on, for each user of all users of the online social network, generating an individual model based on all user information collected from each user. As an example and not by way of limitation, the dynamic interpolation model may include, for each user, a vector or model that is created based on all information collected from the user. As an example and not by way of limitation, for each user of the users of the online social network, user information collected by the social networking system 160 such as the age of the user, the family size and number of children the user has, the user's hobbies and interests, the user's past vacations and trips, and other similar information, may be used to generate the individual model for the user. As an example and not by way of limitation, the individual model for each of the users may include one or more of information on what types of points of interest the user may be interested in, information on what points of interest for a particular geographic location (e.g., Paris, France) that the user may be interested in, or other relevant information. In particular embodiments, the social-networking system 160 may then compare the first user (e.g., based on the user information associated with the first user) with all of the other users and dynamically calculate how similar they are to each other. Then, the social-networking system 160 creates a model for the first user based on one or more of the models of other users determined to be similar to the first user, where the degree of similarity between two users is used as a weight for of that user's model in determining the first user's model. As an example and not by way of limitation, when a new user is added and travel information is to be determined for the user, the method determines which other user(s) have similar vectors or models to the new user, and then builds a dynamic interpolation model for the new user based on a weighed combination of the similar vectors or models of other users (e.g., each weighed based on their similarity to the first user), and this dynamic interpolation model is used to determine one or more points of interest for a particular geographic location (e.g., Paris, France) that the first user may be interested in. Although this disclosure describes generating a travel-recommendation model in a particular manner, this disclosure contemplates generating a travel-recommendation model in any suitable manner.

In particular embodiments, the social-networking system 160 may generate one or more travel recommendations based on the identified one or more second geographic locations. Then, in particular embodiments, the social-networking system 160 may send, to the client system 130 of the first user, one or more of the travel recommendations for display to the first user. In particular embodiments, the one or more travel recommendations displayed to the first user may be ranked based on a relationship between the first user and the one or more second users within a social graph 200 of the online social network. As an example and not by way of limitation, the social-networking system 160 may rank the one or more travel recommendations based on a social-graph affinity between the first user and the one or more second users. As an example and not by way of reference, and as discussed in more detail below, the social-graph affinity that various social-graph entities have for each other may represent the strength of a relationship or level of interest between particular objects (e.g., users) associated with the online social network, and this relationship or level of interest may be used to rank the one or more travel recommendations determined based at least on information from these users. As an example and not by way of limitation, the one or more travel recommendations associated with second users who are first degree friends may be ranked higher than the one or more travel recommendations associated with second users who are second degree friends or third degree friends. Although this disclosure describes ranking the travel recommendations in a particular manner, this disclosure contemplates ranking the travel recommendations in any suitable manner.

In particular embodiments, the one or more travel recommendations may be presented to the first user within a user interface associated with the online social network. Alternatively, in particular embodiments, the one or more travel recommendations may be presented to the first user in a user interface associated with a third-party system 160. In particular embodiments, the recommendations may be presented to the user directly on the UI, or may be presented within the newsfeed that will show up when the user goes to their newsfeed page.

In particular embodiments, as shown in FIG. 6, the social-networking system 160 may send the travel recommendations for display on user interface 400 to the first user by sending a map 610 labeling the one or more second geographic locations 620 representing the one or more travel recommendations. As shown in FIG. 6, in response to a user input of "Paris, France," user interface 400 may include map 610 of a portion of Paris, France that includes a plurality of geographic locations 620 (e.g., points of interest) labeled map 610. As an example and not by way of limitation, a geographic location 620 may be labeled on user interface 400 using location marker 622, and when more than one geographic locations 620 are located close in proximity to each other, a numbered location marker 624 (e.g., "2", and "4") may represent the number of close-proximity geographic locations represented by numbered location marker 624. As shown in FIG. 6, user interface 400 may include a "friends have visited"-labeled area 430 including a listing of points of interest 640 that friends of the first user have visited. In particular embodiments, this list of points of interest 640 may be included in the one or more second geographic locations 620 that represent the one or more travel recommendations. In particular embodiments, each of the points of interest of the listing of points of interest 640 may correspond to a concept node 204 of the social graph 200. In particular embodiments, the user interface associated with the listing of points of interest 640 may include a name 642 associated with each POI (e.g., the Musée du Louvre), an image 644 associated with each POI (e.g., an image associated with the Musée du Louvre as displayed based on information associated with the concept node that is associated with the particular POI), social-networking information 646 associated with each POI (e.g., a list of friends of the first user that have visited the particular POI), and a social-networking button 648 (e.g., a "like" button) that allows the first user to comment on the particular POI.

In particular embodiments, the one or more travel recommendations may be presented on a user interface that also includes one or more of posts, uploads, reshares, and comments associated with the one or more second users relating to the one or more second geographic locations. In addition, user interface 400 may include an aggregation of posts, photos, and/or uploads of all of other users in the user's social network relating to the POI, or an aggregation of all posts, photos, and/or uploads relating to the POI (excluding content that have been labeled as "private" in some form by the uploader/poster, or is otherwise not visible to the user). As shown in FIGS. 7-11, user interface 400 may include a related-posts section 630 associated with the one or more second users. In particular embodiments, the one or more second user may include all users of the online social network. Alternatively, in particular embodiments, the one or more second users may include a subset of users of the online social network (e.g., all users who have visited a particular POI, all users who are first degree friends of the first user, etc.). In particular embodiments, related-posts section 630 may include an aggregation of posts 710 relating to the inputted geographic location of "Paris, France" and posted by the one or more second users. As an example and not by way of limitation, posts 710 may include uploads of a map associated with a geographic location (e.g., as shown in FIG. 7, a map associated with a train station in Paris). As another example and not by way of limitation, posts 710 may include photos of the one or more second geographic locations (e.g., as shown in FIGS. 7-11). As another example and not by way of limitation, posts 710 may include user comments (e.g., comments and/or "likes" associated with the one or more second users, as shown in FIGS. 8-10). Although this disclosure describes the user interface for presenting travel recommendations to the first user and content associated with one or more second users in a particular manner, this disclosure contemplates presenting this information in any suitable manner.

In particular embodiments, the social-networking system 160 may update the travel-recommendation model in real time based on the current geographic location of the first user. As an example and not by way of limitation, as the first user decides to go or not go to a particular POI, the social-networking system 160 may update the recommendation model created for the user in real time by incorporating this user-specific data.

In particular embodiments, the social-networking system 160 may also send one or more advertisements associated with the one or more second geographic locations associated with the travel recommendations. In particular embodiments, the social-networking system 160 may provide customized advertisements targeted to the particular location or POI alongside these travel recommendations. As an example and not by way of limitation, advertisements for amenities, activities, entertainment, and/or food may be provided to the user during the travel period based on certain parameters (e.g., providing hotel advertisements at night when the user is likely to rest and after determining that the user has no prior reservations, restaurant advertisements during mealtimes, museum advertisements when the user is walking around during the daytime, etc.). In particular embodiments, these advertisements may be limited to a specific portion of user interface 400 (e.g., a right-side column) so as to be presented to the user in a visually-highlighted and accessible fashion.

In particular embodiments, the social-networking system 160 may collect the information for the user's travels and then, following the termination of the trip, provide the user with a user-editable summary of the route traveled and points of interest visited (e.g., a travel log). For example, U.S. patent application Ser. No. 14/466,269, which is incorporated herein by reference, describes generating "reaction cards" in response to a post, a check-in at a location, or some other type of user action. As an example and not by way of reference, the social-networking system 160 may use an analogous process to generate a "story" timeline with information from the trip in which the user can fill in details based on the structure provided by the social-networking system 160 (e.g., based on information collected during the user's travels) and upload this information to the social-networking system 160 (e.g., to share with friends). Although this disclosure describes generating a travel log in a particular manner, this disclosure contemplates generating a travel log in any suitable manner.

Figure 12:
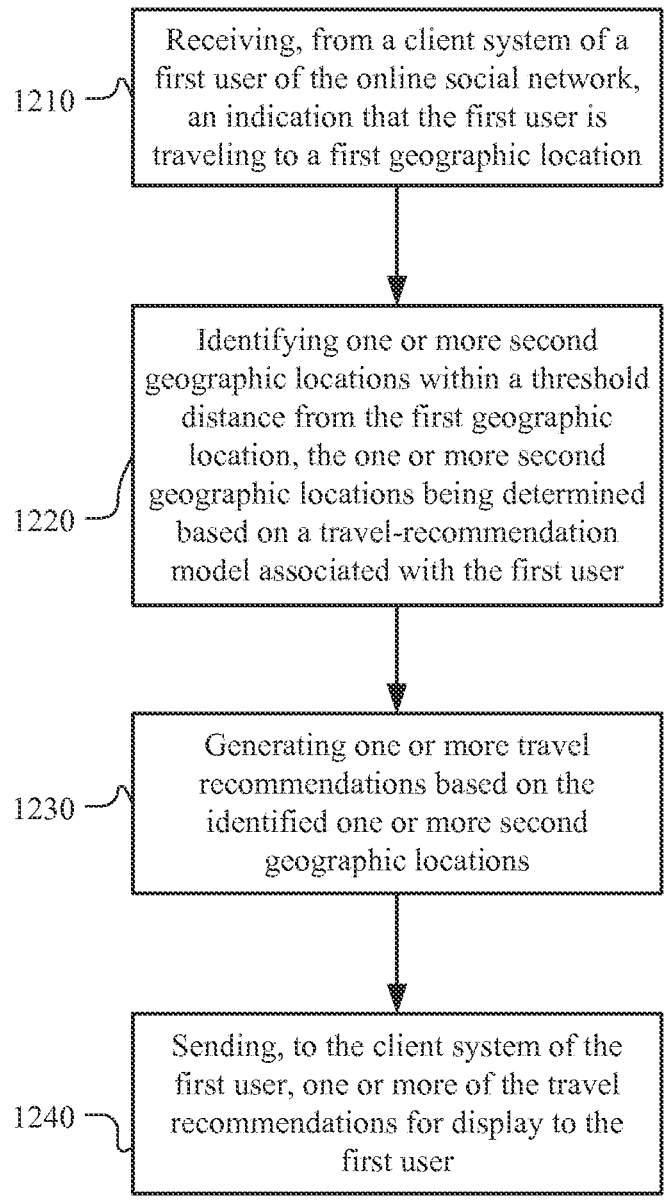
FIG. 12 illustrates an example method for generating travel recommendations for a user that the social-networking system.

FIG. 12 illustrates an example method 1200 for generate travel recommendations for a user. The method may begin at step 1210, where the social-networking system 160 may receive, from a client system of a first user of the online social network, an indication that the first user is traveling to a first geographic location. At step 1220, the social-networking system 160 may identify one or more second geographic locations within a threshold distance from the first geographic location, the one or more second geographic locations being determined based on a travel-recommendation model associated with the first user. The travel-recommendation model may comprise aggregated user information from the online social network associated with the first user and aggregated travel information from the online social network associated with one or more second users of the online social network who have traveled to the first geographic location. At step 1230, the social-networking system 160 may generate one or more travel recommendations based on the identified one or more second geographic locations. At step 1240, the social-networking system 160 may send, to the client system 130 of the first user, one or more of the travel recommendations for display to the first user. Particular embodiments may repeat one or more steps of the method of FIG. 12, where appropriate. Although this disclosure describes and illustrates particular steps of the method of FIG. 12 as occurring in a particular order, this disclosure contemplates any suitable steps of the method of FIG. 12 occurring in any suitable order. Moreover, although this disclosure describes and illustrates an example method for generating travel recommendations including the particular steps of the method of FIG. 12, this disclosure contemplates any suitable method for generating travel recommendations including any suitable steps, which may include all, some, or none of the steps of the method of FIG. 12, where appropriate. Furthermore, although this disclosure describes and illustrates particular components, devices, or systems carrying out particular steps of the method of FIG. 12, this disclosure contemplates any suitable combination of any suitable components, devices, or systems carrying out any suitable steps of the method of FIG. 12.

In particular embodiments, the social-networking system 160 may generate optimized travel itineraries for a user that the social-networking system 160 has determined is or will be traveling to a particular location. Generally, the social-networking system 160 may gather and analyze location data and social graph data for users of the social network in order to provide "travel agent" and "travel log"-like functionalities. As discussed above, when users of the social-networking system 160 go traveling, they frequently post and upload information relating to their travels, including information on points of interest they visited and recommendations/reviews of these points of interest, restaurant recommendations, and general travel tips/recommendations. As an example and not by way of limitation, as discussed above, the social-networking system 160 may have access to information relating to each of these users, including, for example: personal information (e.g., personal preferences/interests such as particular interests in outdoors activities, certain historical periods, etc.; family information such as size of family, number of children, etc.; and historical information such as previous vacations and places/tourist attractions visited, etc.), social network information (e.g., any and all information relating to other users that are part of the user's social network, in addition to information relating to users of the social-networking system 160 at large), and location information (e.g., including GPS information of where the user is or has been, and information on what route these users took for a trip to obtain information on optimal route determination/selection). The social-networking system 160 can aggregate data from all of these sources of information in order to leverage the data to generate optimized travel itineraries for a particular location. In addition, the social-networking system 160 can extract travel information from a user's uploads and/or posts based on classifying the data obtain from these sources of information as relating to sightseeing and traveling, as discussed below. Based on the information collected from the users, the social-networking system 160 can convert this unstructured information regarding travel information associated with a plurality of users into a structured database of route information for specific locations and/or points of interest in a particular area (e.g., a tourist area such as Paris, France). Although this disclosure describes generating optimized travel itineraries for a user of the social-networking system 160 in a particular manner, this disclosure contemplates generating optimized travel itineraries for a user of the social-networking system 160 in any suitable manner.

In particular embodiments, the social-networking system 160 may receive, from a client system 130 of a first user of the online social network, an indication that the first user is at a first geographic location. In particular embodiments, the indication that the first user is at the first geographic location may be determined by analyzing a current geographic location of the first user (e.g., a GPS location of the first user). As an example and not by way of limitation, the social-networking system 160 may determine the first user's GPS information using the GPS sensor of the mobile client system 130. In particular embodiments, the social-networking system 160 may determine that the first user is travelling based on the first user being at the first geographic location. As an example and not by way of limitation, the social-networking system 160 may analyzed the GPS information of the first user in connection with data on the user's typical locations and routes traveled to determine whether the user is outside their normal routine (e.g., outside the user's "hotspots," as discussed above). As an example and not by way of limitation, if the first user being located at the first geographic location is a relatively unusual location for the first user (e.g., at a geographic location that is more than the threshold distance from a hotspot associated with the first user), the social-networking system 160 may determine that the first user is outside her normal routine, and thus traveling. Although this disclosure describes determining whether the user is traveling based on a particular manner, this disclosure contemplates determining whether the user is traveled in any suitable manner. In addition, as discussed above, the determination of hotspots is further described in U.S. patent application Ser. No. 14/323,915, which is incorporated herein by reference.

In particular embodiments, the social-networking system 160 may identify one or more second geographic locations (e.g., points of interest) within a threshold distance from the first geographic location, the one or more second geographic locations being determined based on a travel-recommendation model associated with the first user (as discussed above). When the social-networking system 160 determines that a user is or will be traveling to a particular location, the social-networking system 160 may present to the user a travel itinerary tailored based on, for example, personal circumstances (e.g., the user's age, interests, travel interests, family circumstances, knowledge of the area). In particular embodiments, the travel-recommendation model may include aggregated user information from the online social network associated with the first user. As an example and not by way of limitation, the aggregated user information associated with the first user includes user preferences of the first user, personal information of the first user, historical activities of the first user associated with the online social network, geo-location information and travel information of the first user, and social-networking information of the first user (as discussed above). As an example and not by way of limitation, the social-networking system 160 can extract travel information from the first user's uploads and/or posts based on classifying the data obtain from these sources of information as relating to sightseeing and traveling (by, for example, keyword, label, tag, and/or sentiment analysis, as discussed above). As an example and not by way of limitation, the social-networking system 160 may tailor the travel itinerary based on knowledge of specific characteristics of the user such as the user's age, interests, travel interests, knowledge of the area, and other relevant user information, as described in more detail below.

In particular embodiments, the travel-recommendation model may include aggregated travel information from the online social network associated with one or more second users of the online social network who have traveled to the first geographic location, as discussed above. As an example and not by way of limitation, the aggregated travel information associated with the one or more second users includes content inputted by the one or more second users, and the content is associated with the one or more second geographic locations, as described above. In addition, in particular embodiments, the social-networking system 160 may analyze the content inputted by the one or more second users to categorize the content as relating to a particular activity (e.g., sightseeing, traveling, or other suitable activities) and the analysis being based on labeling information, tag information, or sentiment analysis of the content, as discussed above. In particular embodiments, the content inputted by the one or more second users includes posts, uploads, reshares, and comments. In particular embodiments, the one or more second users of the online social network may include all users of the social-networking system 160, or only a subset of users (e.g., only the users who are "friend" connections with the first user, only the users who are first or second degree contacts with the first user, only the users who have been to a particular geographic location, or other suitable subset of second users). In particular embodiments, the social-networking system 160 may identify the one or more second geographic locations based on the travel-recommendation model. The travel-recommendation model may include one or more of an individual interpolation model, a clustering model, or a dynamic interpolation model, as discussed above.

In particular embodiments, the social-networking system 160 may determine one or more itinerary constraints associated with the first user. In particular embodiments, the one or more itinerary constraints are determined based on travel-time limitations associated with the first user and the aggregated user information associated with the first user. As an example and not by way of limitation, the one or more itinerary constraints may include travel-time limitations, which may include limitations on the amount of total travel time (e.g., the first user may have a one-week travel time scheduled for a particular location). In particular embodiments, the generated travel itinerary may be different based on different lengths of travel time (e.g., a travel constraint of 2 days of travel in Paris, France, results in a different travel itinerary than a travel constraint of only 1 day of travel in Paris, France). As another example and not by way of limitation, the one or more itinerary constraints may include user family information (e.g., the first user may have small children and/or elderly parents and/or grandparents that may require additional care or pose limitations at tourist locations). As another example and not by way of limitation, the one or more itinerary constraints may include a direction of travel (e.g., traveling in a southward direction from San Francisco, Calif., to Pescadero, Calif., may result in a different travel itinerary than traveling in a northward direction from Pescadero to San Francisco, because, for example, the traveler may not want to hit stops that require crossing certain routes and/or landmarks, such as Highway 1). As yet another example and not by way of limitation, the one or more itinerary constraints may include user-specific handicaps (e.g., the first user may have mobility and/or auditory issues that require additional services at tourist locations). Although this disclosure describes certain itinerary constraints, this disclosure contemplates any itinerary constraint that may be relevant to a user's travel modes and/or methods.

In particular embodiments, the social-networking system 160 may generate a travel itinerary for the first user based on the first geographic location, the one or more second geographic locations (e.g., the points of interest determined based on second user information, as discussed above), and the one or more itinerary constraints associated with the first user. In particular embodiments, the social-networking system 160 may generate the travel itinerary for the first user by generating an optimal travel itinerary for the first geographic location based on the aggregated travel information associated with the one or more second users, and tailoring the optimal travel itinerary based on the one or more itinerary constraints associated with the first user. In other words, the travel itinerary may include a list of one or more of the second geographic locations and an optimized route traversing the second geographic locations, and the list and route may be determined based on the aggregated travel information associated with the one or more second users and the one or more itinerary constraints associated with the first user. As an example and not by way of reference, if the social-networking system 160 determines that the first user is traveling to Washington, D.C., the social-networking system 160 may determine one or more routes that one or more second users tend to travel among a plurality of points of interest/tourist attractions (e.g., the route one or more second users take when visiting Washington, D.C. and going to the Smithsonian Museums, the Lincoln Memorial, the Library of Congress, the White house, etc.). The social-networking system 160 may collect user information on the first user from the online social network and determine a current geographic location of the first user based on the GPS sensor of the first user's mobile device (e.g., mobile client system 130). The social-networking system 160 may then generate a structured travel route that is determined based on the user information of the first user, the current geographic location of the first user, and the one or more second geographic locations selected by the travel-recommendation model (discussed above). As an example and not by way of limitation, if the social-networking system 160 determines from user information of the first user that the first user enjoys visiting historically-significant landmarks, has frequently visited historically-significant landmarks in part tourist trips, and that the first user's hotel is located near Union Station, and that the first user has plans to meet with a friend for dinner in Arlington, Va., and social-networking system 160 may determine that the optimal travel itinerary includes first stopping at the U.S. Capital, and then traveling down the Mall to visit any of the Smithsonian Museums, and then visiting the Washington Monument, walking along the Reflecting Pool, visiting the Lincoln Monument, before heading over the Arlington Memorial Bridge to visit the Arlington National Cemetery in Arlington, Va. After determining this optimal travel itinerary, the social-networking system 160 may then tailor a structured travel itinerary for the first user based on itinerary constraints specific to the first user. As an example and not by way of limitation, if the social-networking system 160 determines that the first user starts her travels late in the afternoon, the travel itinerary may be further tailored to cut out some of the beginning points of interest so that the first user can make to on time to her scheduled dinner with a friend. As another example and not by way of limitation, if the social-networking system 160 determines that the first user is traveling with elderly parents, the travel itinerary may be further tailed to cut out some of the points of interest that require extensive walking (e.g., walking along the entirety of the Mall, walking over the Arlington Memorial Bridge, etc.). Although this disclosure describes generating a travel itinerary in a particular manner, this disclosure contemplates generating a travel itinerary in any suitable manner.

In particular embodiments, the social-networking system 160 may send, to the client system 130 of the first user, the travel itinerary for display to the first user. In particular embodiments, the travel itinerary may include the structured travel route traversing plurality of points of interest (e.g., including one or more of the second geographic locations) that are recommended to the first user. As an example and not by way of limitation, the travel itinerary may be displayed to the first user based on a current geographic location of the first user (e.g., the start of the itinerary may be a location that is close by to the first user's current geographic location). In particular embodiments, the one or more second users may include a plurality of subsets of second users that are of various geographic proximities to the first geographic location, and the structured travel route may be determined based on a weighed combination of the aggregated travel information of each of the plurality of subsets of second users such that a first subset of second users that is on average located closer to the first geographic location than a second subset of second users is given a higher weight. As an example and not by way of limitation, the social-networking system 160 may obtain data from users determined to be locals (e.g., users for which a particular geographic location is determined to be a "hotspot" for the user) in addition to users determined to be tourists (e.g., users for which the particular geographic location is determined to not be a "hotspot" for the user), determine weights for each of these subsets of users, and then generate the structured travel routes based on a combined weight of these data sets (e.g., in order to leverage the unique information each group can provide).

In particular embodiments, the social-networking system 160 may send the travel itinerary for display to the first user on a user interface by sending a map labeling a structured travel route including one or more suggested points of interest (e.g., including one or more of the second geographic locations). In particular embodiments, the social-networking system may send the travel itinerary for display to the first user by sending a map associated with the travel itinerary. The user interface of the application may include a map showing the points of interest for a travel location, in addition to relevant markers for the travel itinerary tips (e.g., as shown in FIG. 6). In particular embodiments, the user interface may include the map showing the structured travel route including a numbered list of the suggest points of interest. In particular embodiments, the user interface may include the map showing the structured travel route including a visual representation of a travel path of the structured travel route on the map user interface itself. In particular embodiments, the travel itinerary may be displayed to the first user within a user interface associated with the online social network. Alternatively, in particular embodiments, the travel itinerary may be displayed to the first user in a user interface associated with a third-party system (e.g., third party system 160). Although this disclosure describes sending particular travel itineraries for display in a particular manner, this disclosure contemplates sending any suitable travel itineraries for display in any suitable manner.

In particular embodiments, the travel itinerary may be displayed on a user interface that also includes one or more of posts, uploads, reshares, and comments associated with the one or more second users relating to the one or more second geographic locations. In addition, the UI may include an aggregation of posts, photos, and/or uploads of all of other users in the user's social network relating to the POI, or an aggregation of all posts, photos, and/or uploads relating to the POI, excluding content that have been labeled as "private" in some form by the uploader/poster. In particular embodiments, the social-networking system 160 may also send one or more advertisements associated with the travel itinerary. In particular embodiments, the social-networking system 160 may provide customized advertisements targeted to the particular location or POI alongside these travel itinerary. As an example and not by way of limitation, sponsor-provided amenities and/or food may be provided to the user during the travel period based on certain parameters (e.g., providing hotel advertisements at night when the user is likely to rest and after determining that the user has no prior reservations, restaurant advertisements during mealtimes, etc.). In particular embodiments, these advertisements may be limited to a specific portion of the user interface (e.g., a right-side column) so as to be presented to the user in a visually-highlighted and accessible fashion. Although this disclosure describes the user interface for display other information in addition to the travel itinerary to the first user in a particular manner, this disclosure contemplates presenting this information in any suitable manner.

In particular embodiments, the social-networking system 160 may determine, based on the client system 130 of the first user, a current geographic location of the first user, and update the travel itinerary in real time based on the current geo-location of the first user and the one or more itinerary constraints (e.g., changes to the itinerary constraints that may be updated in real time) associated with the first user. The updating of the travel itinerary in real time may include revising the structured travel route by updating the points of interest recommended to the user. Once these routes are determined, the social-networking system 160 may recommend to a user one or more routes to take when visiting one or more points of interest for a particular (tourist) location based on the user's preferences, timeline/time limitations, itinerary information, travel interests, family information (e.g., kid-friendly points of interest), and other parameters. In addition, the social-networking system 160 can further incorporate a "dynamic GPS" functionality in which recommendations can be made to a user based on an originally planned route and deviations in route logistics and/or timing (e.g., a user stayed at a particular POI for too long, and now must adjust her route for visiting POI attractions based on remaining time, interest, POI restrictions such as closing time or limitations on tourists, etc.). As an example and not by way of limitation, in the example discussed above of the optimal travel itinerary for exploring Washington, D.C. includes first stopping at the U.S. Capital, and then traveling down the Mall to visit any of the Smithsonian Museums, and then visiting the Washington Monument, walking along the Reflecting Pool, visiting the Lincoln Monument, before heading over the Arlington Memorial Bridge to visit the Arlington National Cemetery in Arlington, Va., if the user stays at the Smithsonian Museums for too long (e.g., as determined by the GPS sensor of the first user's mobile device), the social-networking system 160 may update the structured travel itinerary to remove certain points of interest (e.g., the Washington Monument, the Reflecting Pool, the Lincoln Monument) in real time to better fit the changes to the first user's schedule (e.g., so that the first user will still make her dinner with a friend in Arlington). Although this disclosure describes updating the travel itinerary in a particular manner, this disclosure contemplates updating the travel itinerary in any suitable manner.

Figure 13:
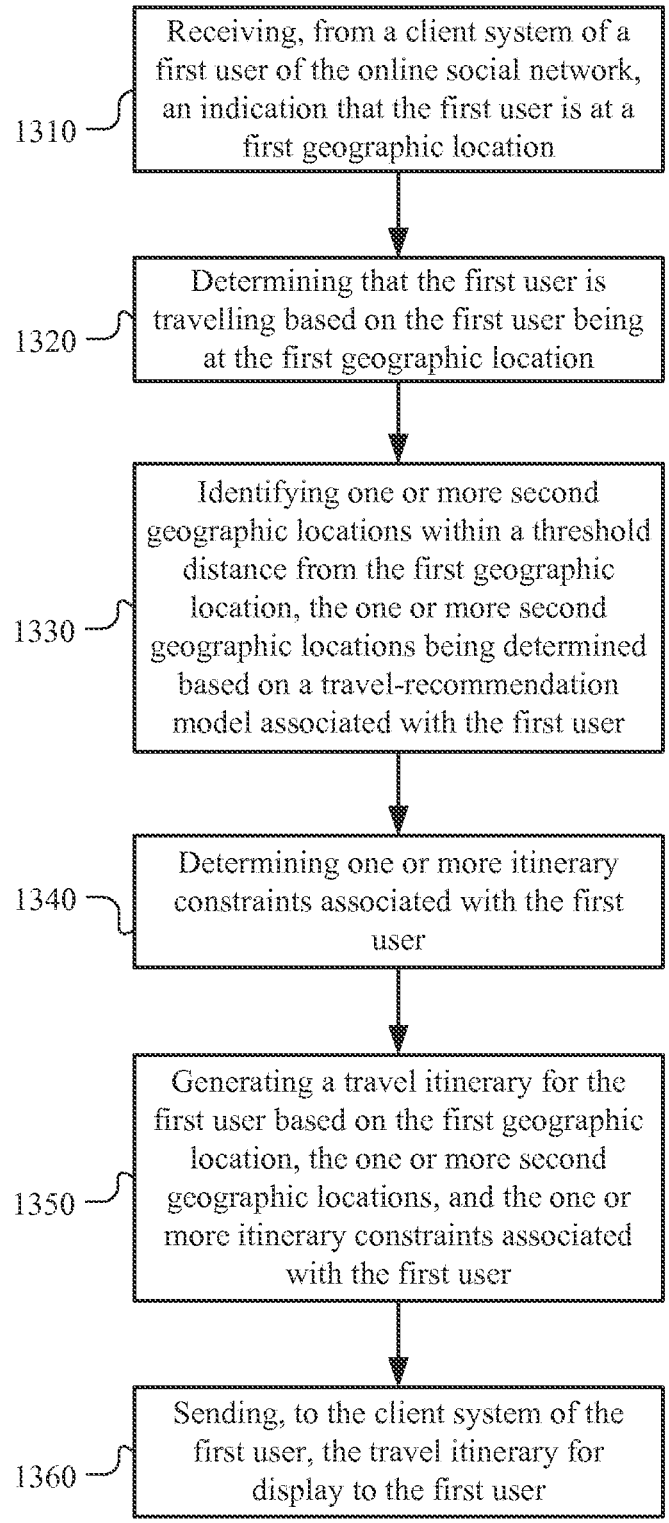
FIG. 13 illustrates an example method for generating optimized travel itineraries for a user that the social-networking system.

FIG. 13 illustrates an example method 1300 for generating optimized travel itineraries for a user of the social-networking system 160. The method may begin at step 1310, where the social-networking system 160 may receive, from a client system of a first user of the online social network, an indication that the first user is at a first geographic location. At step 1320, the social-networking system 160 may determine that the first user is travelling based on the first user being at the first geographic location. At step 1330, the social-networking system 160 may identify one or more second geographic locations within a threshold distance from the first geographic location, the one or more second geographic locations being determined based on a travel-recommendation model associated with the first user. The travel-recommendation model may comprise aggregated user information from the online social network associated with the first user and aggregated travel information from the online social network associated with one or more second users of the online social network who have traveled to the first geographic location. At step 1340, the social-networking system 160 may determine one or more itinerary constraints associated with the first user. At step 1350, the social-networking system 160 may generate a travel itinerary for the first user based on the first geographic location, the one or more second geographic locations, and the one or more itinerary constraints associated with the first user. At step 1360, the social-networking system 160 may send, to the client system 130 of the first user, the travel itinerary for display to the first user. Particular embodiments may repeat one or more steps of the method of FIG. 13, where appropriate. Although this disclosure describes and illustrates particular steps of the method of FIG. 13 as occurring in a particular order, this disclosure contemplates any suitable steps of the method of FIG. 13 occurring in any suitable order. Moreover, although this disclosure describes and illustrates an example method for generating optimized travel itineraries for a user that the social-networking system 160 including the particular steps of the method of FIG. 13, this disclosure contemplates any suitable method for generating optimized travel itineraries for a user that the social-networking system 160 including any suitable steps, which may include all, some, or none of the steps of the method of FIG. 13, where appropriate. Furthermore, although this disclosure describes and illustrates particular components, devices, or systems carrying out particular steps of the method of FIG. 13, this disclosure contemplates any suitable combination of any suitable components, devices, or systems carrying out any suitable steps of the method of FIG. 13.

Social Graph Affinity and Coefficient

In particular embodiments, the social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, the social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part by a history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, the social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, the social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, the social-networking system 160 may calculate a coefficient based on a user's actions. The social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, the social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. The social-networking system 160 may analyze a user's actions to determine whether one or more of the actions indicate an affinity for subject matter, content, other users, and so forth. As an example and not by way of limitation, if a user may make frequently posts content related to "coffee" or variants thereof, the social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, the social-networking system 160 may calculate a coefficient based on the type of relationship between particular objects. Referencing the social graph 200, the social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, the social-networking system 160 may determine that the user has a higher coefficient with respect to the first photo than the second photo because having a tagged-in-type relationship with content may be assigned a higher weight and/or rating than having a like-type relationship with content. In particular embodiments, the social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, the social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, the social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, the social-networking system 160 may determine that the user has a higher coefficient for the airport than the gas station based on the proximity of the airport to the user.

In particular embodiments, the social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, the social-networking system 160 may provide information that is relevant to user's interests and current circumstances, increasing the likelihood that they will find such information of interest. In particular embodiments, the social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, the social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, the social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, the social-networking system 160 may calculate the coefficient (or access the coefficient information if it has previously been calculated and stored). In particular embodiments, the social-networking system 160 may measure an affinity with respect to a particular process. Different processes (both internal and external to the online social network) may request a coefficient for a particular object or set of objects. The social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Advertising

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on the social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, the social-networking system 160 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through the social-networking system 160) or RSVP (e.g., through the social-networking system 160) to an event associated with the advertisement. In addition or as an alternative, an advertisement may include social-networking-system content directed to the user. As an example and not by way of limitation, an advertisement may display information about a friend of the user within the social-networking system 160 who has taken an action associated with the subject matter of the advertisement.

Privacy

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by the social-networking system 160 or shared with other systems (e.g., a third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, the social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Systems and Methods

Figure 14:
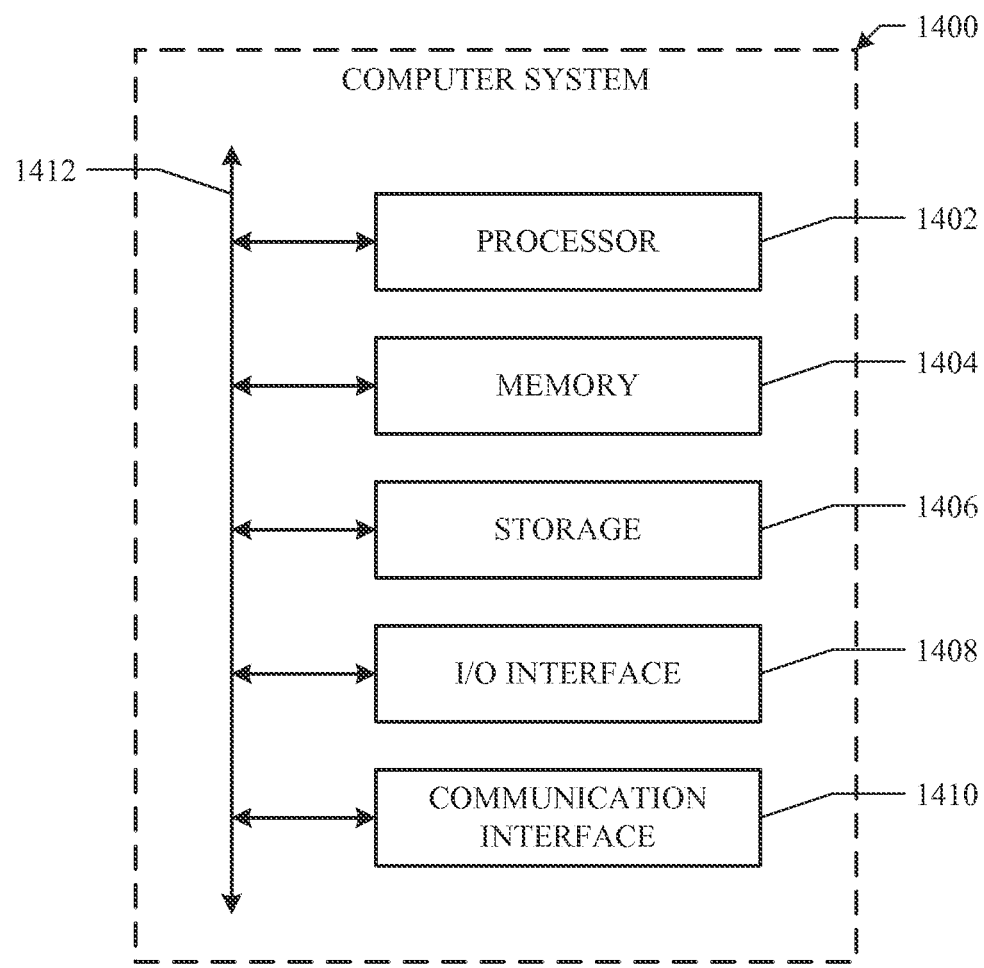
FIG. 14 illustrates an example computer system.

FIG. 14 illustrates an example computer system 1400. In particular embodiments, one or more computer systems 1400 perform one or more steps of one or more methods described or illustrated herein. In particular embodiments, one or more computer systems 1400 provide functionality described or illustrated herein. In particular embodiments, software running on one or more computer systems 1400 performs one or more steps of one or more methods described or illustrated herein or provides functionality described or illustrated herein. Particular embodiments include one or more portions of one or more computer systems 1400. Herein, reference to a computer system may encompass a computing device, and vice versa, where appropriate. Moreover, reference to a computer system may encompass one or more computer systems, where appropriate.

This disclosure contemplates any suitable number of computer systems 1400. This disclosure contemplates computer system 1400 taking any suitable physical form. As example and not by way of limitation, computer system 1400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1400 may include one or more computer systems 1400; be unitary or distributed; span multiple locations; span multiple machines; span multiple data centers; or reside in a cloud, which may include one or more cloud components in one or more networks. Where appropriate, one or more computer systems 1400 may perform without substantial spatial or temporal limitation one or more steps of one or more methods described or illustrated herein. As an example and not by way of limitation, one or more computer systems 1400 may perform in real time or in batch mode one or more steps of one or more methods described or illustrated herein. One or more computer systems 1400 may perform at different times or at different locations one or more steps of one or more methods described or illustrated herein, where appropriate.

In particular embodiments, computer system 1400 includes a processor 1402, memory 1404, storage 1406, an input/output (I/O) interface 1408, a communication interface 1410, and a bus 1412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1402 includes hardware for executing instructions, such as those making up a computer program. As an example and not by way of limitation, to execute instructions, processor 1402 may retrieve (or fetch) the instructions from an internal register, an internal cache, memory 1404, or storage 1406; decode and execute them; and then write one or more results to an internal register, an internal cache, memory 1404, or storage 1406. In particular embodiments, processor 1402 may include one or more internal caches for data, instructions, or addresses. This disclosure contemplates processor 1402 including any suitable number of any suitable internal caches, where appropriate. As an example and not by way of limitation, processor 1402 may include one or more instruction caches, one or more data caches, and one or more translation lookaside buffers (TLBs). Instructions in the instruction caches may be copies of instructions in memory 1404 or storage 1406, and the instruction caches may speed up retrieval of those instructions by processor 1402. Data in the data caches may be copies of data in memory 1404 or storage 1406 for instructions executing at processor 1402 to operate on; the results of previous instructions executed at processor 1402 for access by subsequent instructions executing at processor 1402 or for writing to memory 1404 or storage 1406; or other suitable data. The data caches may speed up read or write operations by processor 1402. The TLBs may speed up virtual-address translation for processor 1402. In particular embodiments, processor 1402 may include one or more internal registers for data, instructions, or addresses. This disclosure contemplates processor 1402 including any suitable number of any suitable internal registers, where appropriate. Where appropriate, processor 1402 may include one or more arithmetic logic units (ALUs); be a multi-core processor; or include one or more processors 1402. Although this disclosure describes and illustrates a particular processor, this disclosure contemplates any suitable processor.

In particular embodiments, memory 1404 includes main memory for storing instructions for processor 1402 to execute or data for processor 1402 to operate on. As an example and not by way of limitation, computer system 1400 may load instructions from storage 1406 or another source (such as, for example, another computer system 1400) to memory 1404. Processor 1402 may then load the instructions from memory 1404 to an internal register or internal cache. To execute the instructions, processor 1402 may retrieve the instructions from the internal register or internal cache and decode them. During or after execution of the instructions, processor 1402 may write one or more results (which may be intermediate or final results) to the internal register or internal cache. Processor 1402 may then write one or more of those results to memory 1404. In particular embodiments, processor 1402 executes only instructions in one or more internal registers or internal caches or in memory 1404 (as opposed to storage 1406 or elsewhere) and operates only on data in one or more internal registers or internal caches or in memory 1404 (as opposed to storage 1406 or elsewhere). One or more memory buses (which may each include an address bus and a data bus) may couple processor 1402 to memory 1404. Bus 1412 may include one or more memory buses, as described below. In particular embodiments, one or more memory management units (MMUs) reside between processor 1402 and memory 1404 and facilitate accesses to memory 1404 requested by processor 1402. In particular embodiments, memory 1404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1404 may include one or more memories 1404, where appropriate. Although this disclosure describes and illustrates particular memory, this disclosure contemplates any suitable memory.

In particular embodiments, storage 1406 includes mass storage for data or instructions. As an example and not by way of limitation, storage 1406 may include a hard disk drive (HDD), a floppy disk drive, flash memory, an optical disc, a magneto-optical disc, magnetic tape, or a Universal Serial Bus (USB) drive or a combination of two or more of these. Storage 1406 may include removable or non-removable (or fixed) media, where appropriate. Storage 1406 may be internal or external to computer system 1400, where appropriate. In particular embodiments, storage 1406 is non-volatile, solid-state memory. In particular embodiments, storage 1406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1406 taking any suitable physical form. Storage 1406 may include one or more storage control units facilitating communication between processor 1402 and storage 1406, where appropriate. Where appropriate, storage 1406 may include one or more storages 1406. Although this disclosure describes and illustrates particular storage, this disclosure contemplates any suitable storage.

In particular embodiments, I/O interface 1408 includes hardware, software, or both, providing one or more interfaces for communication between computer system 1400 and one or more I/O devices. Computer system 1400 may include one or more of these I/O devices, where appropriate. One or more of these I/O devices may enable communication between a person and computer system 1400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1408 for them. Where appropriate, I/O interface 1408 may include one or more device or software drivers enabling processor 1402 to drive one or more of these I/O devices. I/O interface 1408 may include one or more I/O interfaces 1408, where appropriate. Although this disclosure describes and illustrates a particular I/O interface, this disclosure contemplates any suitable I/O interface.

In particular embodiments, communication interface 1410 includes hardware, software, or both providing one or more interfaces for communication (such as, for example, packet-based communication) between computer system 1400 and one or more other computer systems 1400 or one or more networks. As an example and not by way of limitation, communication interface 1410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1410 for it. As an example and not by way of limitation, computer system 1400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1400 may include any suitable communication interface 1410 for any of these networks, where appropriate. Communication interface 1410 may include one or more communication interfaces 1410, where appropriate. Although this disclosure describes and illustrates a particular communication interface, this disclosure contemplates any suitable communication interface.

In particular embodiments, bus 1412 includes hardware, software, or both coupling components of computer system 1400 to each other. As an example and not by way of limitation, bus 1412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1412 may include one or more buses 1412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing devices of an online social network:
receiving, from a client system of a first user of the online social network, an indication that the first user is traveling to a first geographic location;
identifying one or more second geographic locations within a threshold distance from the first geographic location, the one or more second geographic locations being determined based on a travel-recommendation model associated with the first user, the travel-recommendation model comprising:
aggregated user information from the online social network associated with the first user; and
aggregated travel information from the online social network associated with one or more second users of the online social network who have traveled to the first geographic location;
wherein the travel recommendation model comprises using the aggregated user information associated with the first user and the aggregated travel information associated with the one or more second users to generate one or more user-specific models, and when a new user is added to the online social network, the one or more user-specific models are updated to incorporate user information associated with the new user;
generating one or more travel recommendations based on the identified one or more second geographic locations; and
sending, to the client system of the first user, one or more of the travel recommendations for display to the first user.

2. The method of claim 1, wherein the indication that the first user is traveling to the first geographic location is determined based on one or more of:
accessing user-provided information from the online social network indicating that the user is traveling to the first geographic location; or
analyzing a current geo-location information of the user.

3. The method of claim 2, wherein analyzing the current geo-location information of the first user further comprises:
generating a location history associated with the first user, the location history comprising:
one or more geographic locations associated with the user; and
one or more time stamps corresponding to each of the geographic locations;
determining a plurality of hotspots associated with the first user based on the location history; and
determining that a current geographic location of the first user is more than a threshold distance from one or more of the plurality of hotspots.

4. The method of claim 1, wherein the aggregated user information associated with the first user comprises one or more of:
user preferences of the first user;
personal information of the first user;
historical activities of the first user associated with the online social network;
geo-location information and travel information of the first user; or
social-networking information of the first user.

5. The method of claim 4, wherein the aggregated travel information associated with the one or more second users comprises content inputted by the one or more second users, wherein the content is associated with the one or more second geographic locations.

6. The method of claim 5, further comprising:
analyzing the content inputted by the one or more second users to categorize the content as relating to sightseeing or traveling, the analysis being based on labeling information, tag information, sentiment analysis of the content.

7. The method of claim 5, wherein the content inputted by the one or more second users comprises posts, upload, reshares and comments.

8. The method of claim 1, wherein the travel-recommendation model further comprises an individual interpolation model generated based on a weighted combination of at least one individual user model and a global user model,
the individual user interpolation model being determined for each of the one or more second users based on all travel information associated with the one or more second users, and
the global user interpolation model being determined based on aggregated travel information for all users of the online social network who have traveled to the first geographic location.

9. The method of claim 1, wherein the travel-recommendation model further comprises a clustering model generated based on:
clustering all users of the online social network into a plurality of groups based on predetermined user characteristics,
determining a travel-recommendation group model for each of these groups, and
determining the group the first user should be identified with based on the predetermined user characteristics, and using the associated travel-recommendation group model as the travel-recommendation model for the first user.

10. The method of claim 1, wherein the travel-recommendation model further comprises a dynamic interpolation model generated based on:
for each user of all users of the online social network, generating an individual model based on all user information collected from each user,
determining one or more users of all the users of the online social network that are similar to the first user based on the user information, and
building a dynamic model for the first user based on a weighed combination of all of the one or more users determined to be similar to the first user.

11. The method of claim 1, wherein the one or more travel recommendations displayed to the first user are ranked based on a relationship between the first user and the one or more second users within a social graph of the online social network.

12. The method of claim 1, further comprising:
accessing a social graph comprising a plurality of nodes and a plurality of edges connecting the nodes, each of the edges between two of the nodes representing a single degree of separation between them, the nodes comprising:
a first node corresponding to the first user;
a plurality of second nodes corresponding to a plurality of objects associated with the online social network, respectively.

13. The method of claim 1, wherein the one or more travel recommendations are presented to the first user within a user interface associated with the online social network.

14. The method of claim 1, wherein the one or more travel recommendations are presented to the first user in a user interface associated with a third-party system.

15. The method of claim 1, wherein sending the travel recommendations for display to the first user comprises sending a map labeling the one or more second geographic locations of the one or more travel recommendations.

16. The method of claim 1, wherein the one or more travel recommendations are presented on a user interface that also comprises one or more of posts, uploads, reshares, and comments associated with the one or more second users relating to the one or more second geographic locations.

17. The method of claim 1, wherein the travel-recommendation model is updated in real time based on a current geographic location of the first user.

18. The method of claim 1, further comprising sending one or more advertisements associated with the one or more second geographic locations associated with the travel recommendations.

19. The method of claim 1, wherein the new user added to the online social network corresponds to a second user of the one or more second users with user information comprising new travel information.

20. One or more computer-readable non-transitory storage media embodying software that is operable when executed to:
receive, from a client system of a first user of the online social network, an indication that the first user is traveling to a first geographic location;
identify one or more second geographic locations within a threshold distance from the first geographic location, the one or more second geographic locations being determined based on a travel-recommendation model associated with the first user, the travel-recommendation model comprising:
aggregated user information associated with the first user from the online social network; and
aggregated travel information associated with one or more second users who have traveled to the first geographic location from the online social network, the one or more second users being associated with the online social network;
wherein the travel-recommendation model comprises using the aggregated user information associated with the first user and the aggregated travel information associated with the one or more second users to generate one or more user-specific models, and when a new user is added to the online social network, the one or more user-specific models are updated to incorporate user information associated with the new user;
generate one or more travel recommendations based on the identified one or more geographic locations; and
send, to the client system of the first user, one or more of the travel recommendations for display to the first user.

21. A system comprising: one or more processors; and a non-transitory memory coupled to the processors comprising instructions executable by the processors, the processors operable when executing the instructions to:
receive, from a client system of a first user of the online social network, an indication that the first user is traveling to a first geographic location;
identify one or more second geographic locations within a threshold distance from the first geographic location, the one or more second geographic locations being determined based on a travel-recommendation model associated with the first user, the travel-recommendation model comprising:
aggregated user information associated with the first user from the online social network; and
aggregated travel information associated with one or more second users who have traveled to the first geographic location from the online social network, the one or more second users being associated with the online social network;
wherein the travel-recommendation model comprises using the aggregated user information associated with the first user and the aggregated travel information associated with the one or more second users to generate one or more user-specific models, and when a new user is added to the online social network, the one or more user-specific models are updated to incorporate user information associated with the new user;
generate one or more travel recommendations based on the identified one or more geographic locations; and
send, to the client system of the first user, one or more of the travel recommendations for display to the first user.

* * * * *